US011965627B2

(12) United States Patent
Tillett et al.

(10) Patent No.: US 11,965,627 B2
(45) Date of Patent: Apr. 23, 2024

(54) MODULAR LIGHTING FIXTURES AND METHODS FOR USE IN FORMING MODULAR LIGHTING FIXTURES

(71) Applicant: LANDSCAPE FORMS, INC., Kalamazoo, MI (US)

(72) Inventors: Linnaea Tillett, Brooklyn, NY (US); Janet Garwood, Langhorne, PA (US); Kirt Martin, Ada, MI (US); Brian Revoir, Vicksburg, MI (US); Eric Nelson, Richland, MI (US)

(73) Assignee: LANDSCAPE FORMS, INC., Kalamazoo, MI (US)

( * ) Notice: Subject to any disclaimer, the term of this patent is extended or adjusted under 35 U.S.C. 154(b) by 0 days.

(21) Appl. No.: 17/929,829

(22) Filed: Sep. 6, 2022

(65) Prior Publication Data

US 2024/0077182 A1 Mar. 7, 2024

(51) Int. Cl.
*F21S 2/00* (2016.01)
*F21V 21/10* (2006.01)

(52) U.S. Cl.
CPC .............. *F21S 2/005* (2013.01); *F21V 21/10* (2013.01)

(58) Field of Classification Search
CPC .............. F21S 2/005; F21S 4/28; F21V 21/10
See application file for complete search history.

(56) References Cited

U.S. PATENT DOCUMENTS 7,766,505 B2 * 8/2010 Tseng .................... F21V 29/763 362/249.11
D719,287 S 12/2014 Sorensen et al.
9,004,715 B1 * 4/2015 Litke ....................... A47F 3/001 362/218
10,989,375 B2 * 4/2021 Santos ...................... F21V 5/04
11,365,554 B2 * 6/2022 Chia ........................ F21S 8/085
2012/0002409 A1 * 1/2012 Donauer ................ A47H 1/144 362/218
2023/0030164 A1 * 2/2023 Sonneman .............. F21S 2/005

OTHER PUBLICATIONS

Linnaea Tillett et al., U.S. Appl. No. 29/866,268, filed Sep. 6, 2022, entitled "Lighting Fixture".

(Continued)

*Primary Examiner* — Arman B Fallahkhair
(74) *Attorney, Agent, or Firm* — Heslin Rothenberg Farley & Mesiti

(57) ABSTRACT

Modular lighting fixtures include, for example, a section having an elongated member and at least one light source. The elongated member includes an upper portion, a lower portion, an H-shaped cross-section, a longitudinal axis, and a first flange, a second flange, and a web defining a first channel along a first side of the web and the flanges and a second channel along a second side of the web and the flanges. The at least one light source is attached to the upper portion of the elongated member. The section may be a main section, a first upper section, and/or a second upper section. The sections may have a hollow cross-section and the flanges of the sections may be disposed at 90 degrees relative to each other. Methods for use in forming modular lighting fixtures and methods for illumination are also disclosed.

25 Claims, 23 Drawing Sheets

(56) References Cited

OTHER PUBLICATIONS

Press Release, "Landscape Forms Partners with Award-Winning Lighting Designer Linnaea Tillett to Introduce the Profile Family of Lights," Landscape Forms, Inc., Kalamazoo, Michigan, printout available on May 10, 2022, at https://www.landscapeforms.com/en-US/NewsReleases/Pages/Landscape-Forms-Partners-with-Award-Winning-Lighting-Designer-Linnaea-Tillett-to-Introduce-the-Profile-Family-of-Lights.aspx, 2 pages, Sep. 9, 2021.

Light Reimagined—Profile Lighting Fixtures, available from Landscape Forms Inc., Kalamazoo, Michigan, printout available on May 10, 2021, Wayback Verification Crawl Presence dated Nov. 2, 2021, 17 pages, Nov. 2, 2021.

* cited by examiner

MODULAR LIGHTING FIXTURES AND METHODS FOR USE IN FORMING MODULAR LIGHTING FIXTURES

CROSS-REFERENCE TO RELATED APPLICATION

This application is related to commonly assigned, co-filed U.S. design patent application no. 29/866,268 filed on Sep. 6, 2022, by Tillett et al., entitled “Lighting Fixture”, which application is incorporated herein by reference in its entirety.

TECHNICAL FIELD

The present disclosure relates generally to lighting fixtures, and more particularly to modular lighting fixtures, methods for use in forming modular lighting fixtures, and methods for illumination.

BACKGROUND

Various lighting fixture have been employed for providing illumination in outdoor areas. Such lighting fixtures include area lights, accent lights, path lights, and illuminated bollards. Area lighting provides light for illuminating large areas. Accent lighting includes directional lighting which highlights an object or attracts attention to a particular area. Path lights or Illuminated bollards include a series of short posts set at intervals to provide localized light to delimit an area and/or exclude vehicles.

SUMMARY

Shortcomings of the prior art are overcome and additional advantages are provided through the provision of lighting fixtures having, for example, a section having an elongated member and at least one light source. The elongated member includes an upper portion, a lower portion, an H-shaped cross-section, and a longitudinal axis. The elongated member includes a first flange, a second flange, and a web defining a first channel along a first side of the web and the flanges and a second channel along a second side of the web and the flanges. The at least one light source is attached to the elongated member.

In some embodiments, the at least one light source is positioned adjacent to the upper portion of the elongated member and disposed entirely within the first channel, and light from the at least one light source is directed downwardly along the first channel of the elongated member. In some embodiments, the at least one light source is disposed in a housing positioned adjacent to the upper portion of the elongated member, and the housing extends outwardly from the elongated member between the first flange and the second flange of the elongated member.

In other embodiments, the lighting fixtures may include the above section being a main section, the elongated member being a main elongated member, the longitudinal axis being a main longitudinal axis, and further include a first elongated member. The first elongated member includes an upper portion, a lower portion, an H-shaped cross-section, and a first longitudinal axis. The first elongated member includes a first flange, a second flange, and a web defining a first channel along a first side of the web and the flanges and a second channel along a second side of the web and the flanges. The lower portion of the first elongated member is operably attached to the upper portion of the main elongated member. The main longitudinal length being greater than the first longitudinal length. The main longitudinal axis is coaxial with the first longitudinal axis, and the flanges of the first elongated member being disposed 90 degrees relative the flanges of the main elongated member.

In other embodiments, the lighting fixtures may include the above section being a first section, the elongated member being a first elongated member, the longitudinal axis being a first longitudinal axis, the at least one light source includes at least one first light source, along with a main elongated member having an upper portion, a lower portion, an H-shaped cross-section, and a main longitudinal axis. The main elongated member includes a first flange, a second flange, and a web defining a first channel along a first side of the web and the flanges and a second channel along a second side of the web and the flanges. The lower portion of the first elongated member is operably attached to the upper portion of the main elongated member. The main longitudinal length being greater than the first longitudinal length. The main longitudinal axis is coaxial with the first longitudinal axis, and the flanges of the first elongated member being disposed 90 degrees relative the flanges of the main elongated member.

In other embodiments, the lighting fixtures may include the above section being a second section, the elongated member includes a second elongated member, the longitudinal axis includes a second longitudinal axis, the at least one light source includes at least one second light source, and further including a main elongated member and a first elongated member. The main elongated member includes an upper portion, a lower portion, an H-shaped cross-section, and a main longitudinal axis. The main elongated member includes a first flange, a second flange, and a web defining a first channel along a first side of the web and the flanges and a second channel along a second side of the web and the flanges. The first elongated member includes an upper portion, a lower portion, an H-shaped cross-section, and a first longitudinal axis. The first elongated member includes a first flange, a second flange, and a web defining a first channel along a first side of the web and the flanges and a second channel along a second side of the web and the flanges. The lower portion of the first elongated member is operably attached to the upper portion of the main elongated member. The lower portion of the second elongated member is operably attached to the upper portion of the first elongated member. The main longitudinal length is greater than the first longitudinal length, and the main longitudinal length being greater than the second longitudinal length. The main longitudinal axis is coaxially with the first longitudinal axis and the second longitudinal axis. The flanges of the first elongated member are disposed 90 degrees relative the flanges of the main elongated member, and the flanges of the second elongated member are disposed 90 degrees relative the flanges of the first elongated member.

In some embodiments, the lighting fixtures include the elongated member having a longitudinal length greater than 9 feet. In other embodiments, the elongated member may have a longitudinal length of 2 feet. In further embodiments, the lighting fixture may be a path light or bollard with the elongated member having a longitudinal length between 3 feet and 4 feet.

In other embodiments, methods for use in forming a modular lighting fixture, may include, for example, receiving a selection for an elongated member from a plurality of different elongated members having an upper portion, a lower portion, an H-shaped cross-section, and a longitudinal axis. The elongated member includes a first flange, a second flange, and a web defining a first channel along a first side of the web and the flanges and a second channel along a second side of the web and the flanges, and receiving a selection of at least one light source from a plurality of different light sources.

In other embodiments, methods may include obtaining an elongated member based on the received selected elongated member, obtaining at least one light source based on the received selected at least one first light source, and attaching the at least one obtained light source to the obtained elongated member, and wherein the attaching includes attaching the obtained at least one light source adjacent to the upper portion of the elongated member and entirely within the first channel of the elongated member so that light from the at least one light source is directed downwardly along the first channel of the elongated member or the attaching includes attaching the obtained at least one light source in a housing positioned adjacent to the upper portion of the elongated member and extending outwardly from the elongated member between the first flange and the second flange of the section.

In other embodiments, methods may include providing a vertically disposed section having an elongated member having a longitudinal axis with an H-shaped cross-section and at least one light source, and illuminating a channel of the H-shaped elongated member.

BRIEF DESCRIPTION OF THE DRAWINGS

The subject matter which is regarded as the disclosure is particularly pointed out and distinctly claimed in the concluding portion of the specification. The disclosure, however, may best be understood by reference to the following detailed description of various embodiments and the accompanying drawings in which:

DETAILED DESCRIPTION

The present disclosure is directed to modular lighting fixtures that, as described in greater detail below, may be assembled from one or more sections having an H-shaped cross-section with one or more light sources. In some embodiments, the modular lighting fixtures may be assembled from a selection from one of a plurality of different main sections, a selection from one of a plurality of different first upper sections, a selection from one of a plurality of different second upper sections. The main sections and the first and second upper sections may have elongated members having an H-shaped cross-section.

As will be appreciated, the lighting fixtures and modular lighting fixtures may provide emitted light from an elongated, refined minimalist design. The light emitted from the one or more elongated members having an H-shaped cross-section may provide illumination that may result in shadows and a play of light upon compartmentalized portions of the modular lighting fixture and various illumination of its surroundings. The modular lighting fixtures may be readily installed in outdoor spaces such as near buildings and along walkways. The modular lighting fixtures assembled from the various components, described in greater detail below, may provide designers with a palette or plurality of different configurable selectable options to create aesthetic and performance appearances to fit a variety of applications from large, open areas and narrow pathways to landscape beds and building entrances.

Figure 1:
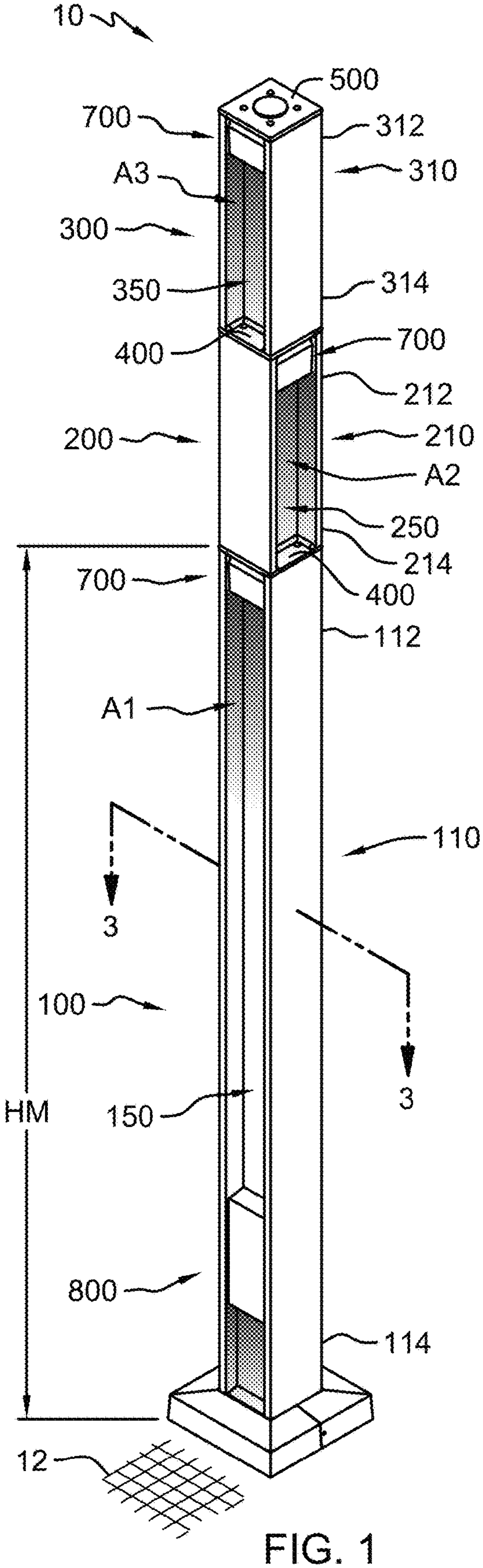
FIG. 1 is a front right perspective view of a modular lighting fixture having a plurality of sections with accent light sources, according to an embodiment of the present disclosure.
Figure 2:
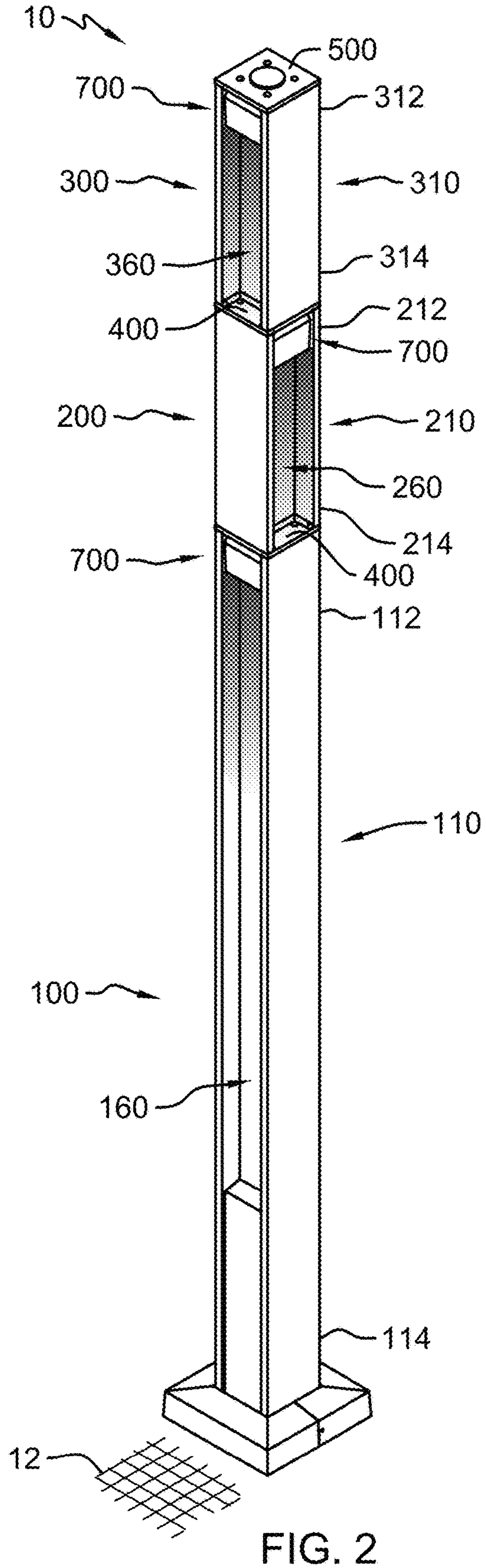
FIG. 2 is a rear left perspective view of the modular lighting fixture of FIG. 1, according to an embodiment of the present disclosure.

FIGS. 1 and 2 illustrate front right and rear left perspective views of a modular lighting fixture 10 attached to a support structure 12 such as the ground, walkway, etc., according to an embodiment of the present disclosure. In this illustrated embodiment, modular lighting fixture 10 may generally include a main section 100, a first upper section 200, a second upper section 300. The sections may include a plurality of light sources 700, and a footer light source 800 (FIG. 1). For example, modular lighting fixture 10 defines a lighting pole in which the main section is a vertically disposed main section, the first upper section is a vertically disposed first upper section, and the second upper section is vertically disposed second upper section so that the assembled modular lighting fixture may be supported and disposed in a vertical orientation.

As shown in FIGS. 1 and 2, light sources 700 may be disposed in the upper portions of the sections to illuminate portions of the main section and the upper sections. For example, light sources 700 may illuminate essentially the entire recessed compartmentalized portions of upper sections 200 and 300. Light sources 700 may illuminate upper recessed portions of main section 100 with the illumination effect tapering or decreasing downwardly.

Figure 3:
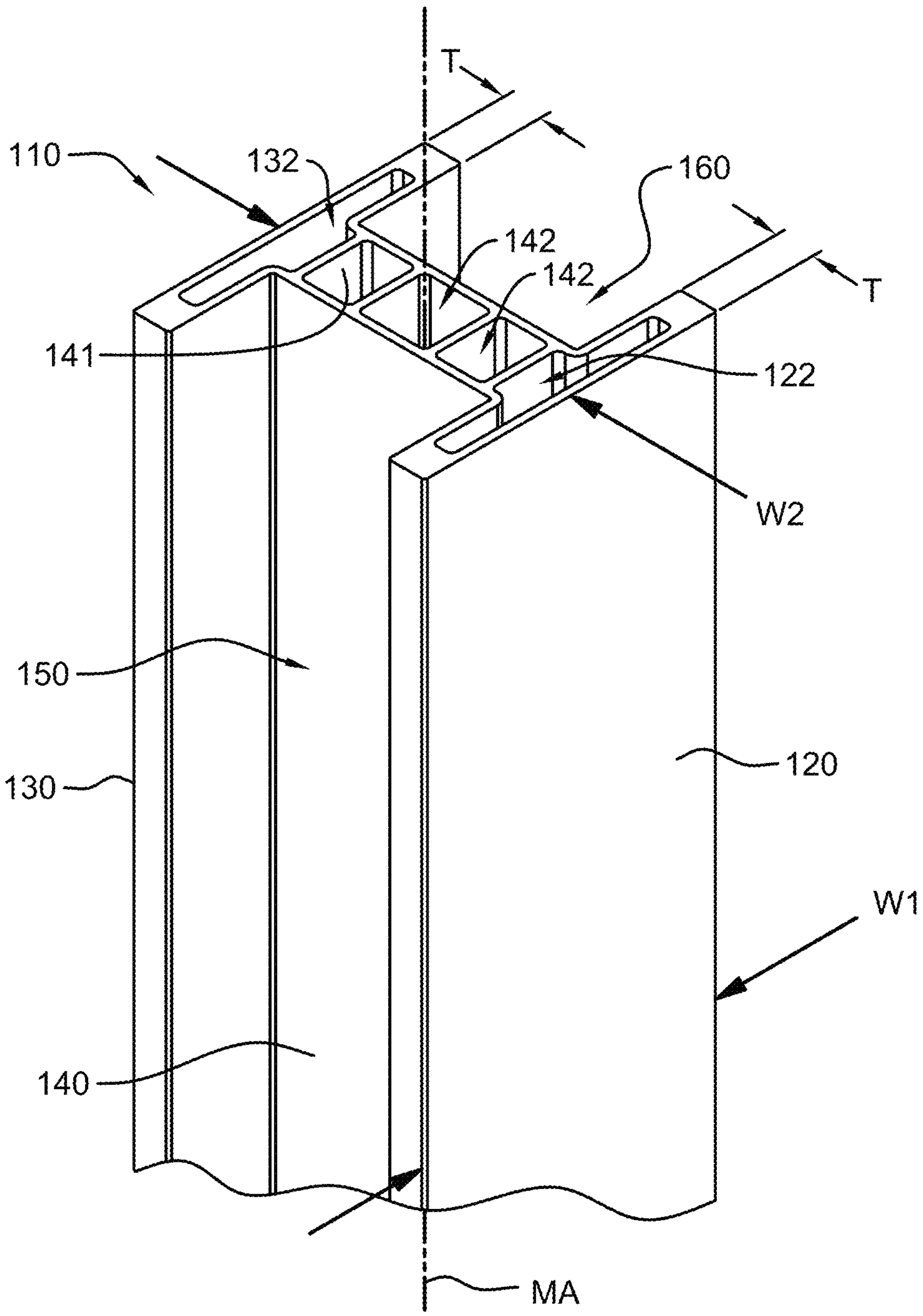
FIG. 3 is an enlarged partial perspective view of the elongated member of the main section of the modular lighting fixture of FIG. 1, according to an embodiment of the present disclosure.

Main section 100 may include an elongated member 110 having an upper portion 112 and a lower portion 114. With reference to FIG. 3, elongated member 110 may define a main longitudinal axis MA. Elongated member 110 may have an H-shaped cross-section. For example, elongated member 110 may include a first flange 120, a second flange 130, and a web 140 defining a first channel 150 along a first side of web 140 and the flanges and a second channel 160 along a second side of web 140 and the flanges. In this illustrated embodiment, the flanges may have a constant thickness T. Elongated member 110 may be hollow having cavities 122 and 132 that run the length of the flanges 120 and 130, respectively, and a plurality of ribs 141 that define a plurality of cavities 142 that run the length of the web. Elongated member 110 may include flanges 120 and 130 having a width W1 from one distal edge to the other distal edge, which width W1 may be equal or generally equal to a width W2 from the outside of one flange to the outside of the other flange.

Figure 4:
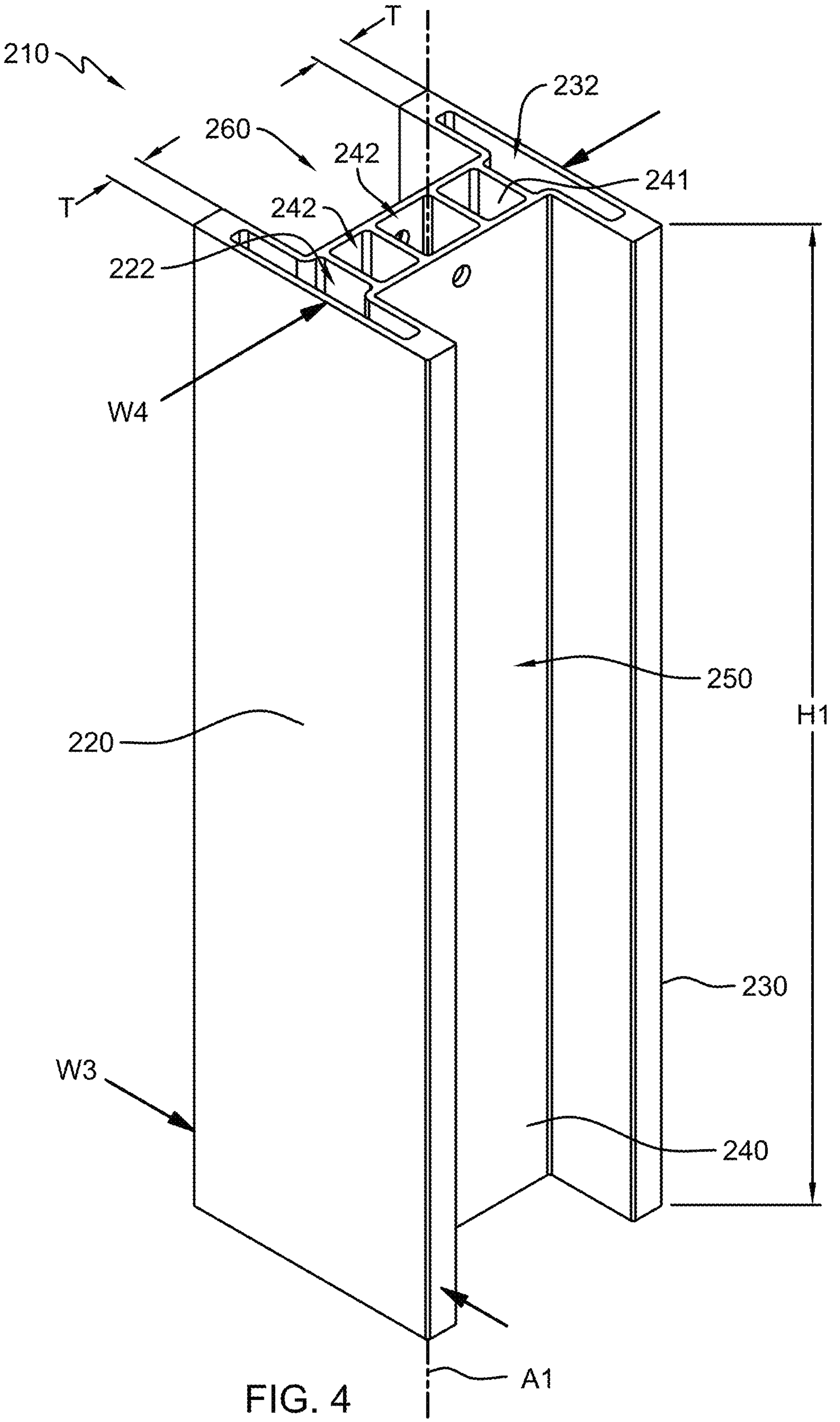
FIG. 4 is an enlarged perspective view of the elongated member of the first upper section of the modular lighting fixture of FIG. 1, according to an embodiment of the present disclosure.

With reference again to FIGS. 1 and 2, first upper section 200 may include an elongated member 210 having an upper portion 212 and a lower portion 214. As shown in FIG. 4, elongated member 210 may define a longitudinal axis A1. Elongated member 210 may have an H-shaped cross-section. For example, elongated member 210 may include a first flange 220, a second flange 230, and a web 240 defining a first channel 250 along a first side of web 240 and the flanges and a second channel 260 along a second side of web 240 and the flanges. In this illustrated embodiment, the flanges may have a constant thickness T. The elongated member 210 may be hollow having cavities 222 and 232 that run the length of the flanges 220 and 230, respectively, and a plurality of ribs 241 that define a plurality of cavities 242 that run the length of web 240. Elongated member 210 may include flanges 220 and 230 having a width W3 from one distal edge to the other distal edge, which width W3 may be equal or generally equal to a width W4 from the outside of one flange to the outside of the other flange.

Figure 5:
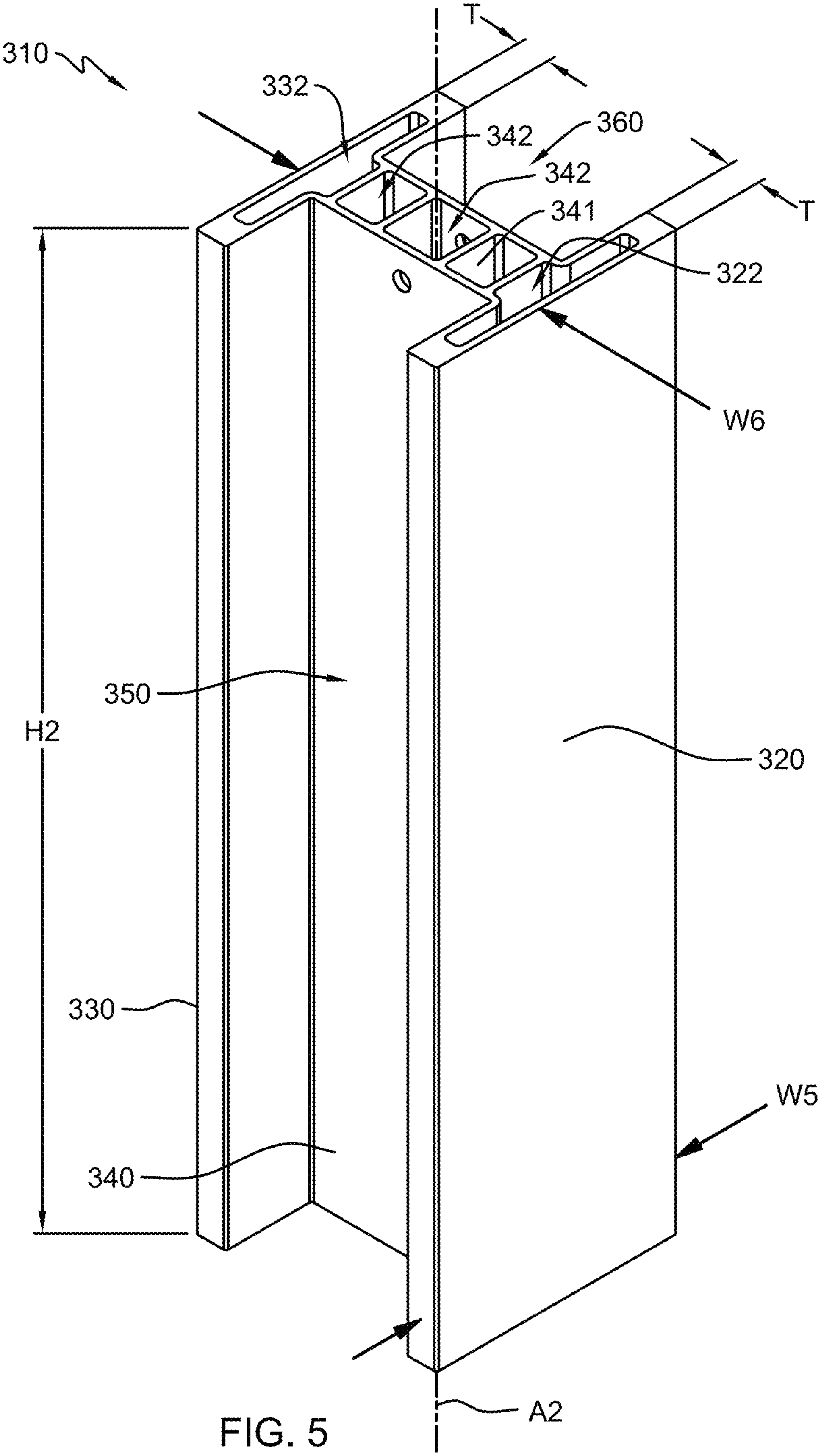
FIG. 5 is an enlarged perspective view of the elongated member of the second upper section of the modular lighting fixture of FIG. 1, according to an embodiment of the present disclosure.

With reference again to FIGS. 1 and 2, second upper section 300 may include an elongated member 310 having an upper portion 312 and a lower portion 314. As shown in FIG. 5, elongated member 310 may define a longitudinal axis A2. Elongated member 310 may have an H-shaped cross-section. For example, elongated member 310 may include a first flange 320, a second flange 330, and a web 340 defining a first channel 350 along a first side of web 340 and the flanges and a second channel 360 along a second side of web 340 and the flanges. In this illustrated embodiment, the flanges may have a constant thickness T. The elongated member 310 may be hollow having cavities 322 and 332 that run the length of the flanges 320 and 330, respectively, and a plurality of ribs 341 that define a plurality of cavities 342 that run the length of web 340. Elongated member 310 may include the flanges 320 and 330 having a width W5 from one distal edge to the other distal edge, which width W5 may be equal or generally equal to the width W6 from the outside of one flange to the outside of the other flange.

The main elongated member, the first elongated member, and the second elongated member may have similar cross-sectional widths and thicknesses. It will be appreciated that in other embodiments, the main elongated member, first elongated member, and second elongated member may have flanges and a web that differ in widths and thicknesses.

With reference again to FIGS. 3-5, main elongated member 110 may have a main longitudinal length HM (FIG. 1), first elongated member 210 may have a first longitudinal length H1, and second elongated member 310 may have a second longitudinal length L2. The main longitudinal length may be greater than the first longitudinal length. The main longitudinal length may be greater than the second longitudinal length. In some embodiment, the first longitudinal length may be equal to or about the same as the second longitudinal length. The main longitudinal axis MA (FIG. 3), the first longitudinal axis A1 (FIG. 4), and the second longitudinal axis A2 (FIG. 5) may be coaxially aligned. The flanges of the first elongated member may be disposed degrees relative the flanges of the main elongated member. The flanges of the second upper elongated member may be disposed 90 degrees relative the flanges of the first upper elongated member. The flanges of the second elongated member may be vertically aligned relative the flanges of the main elongated member. In other embodiments, the main elongated member may have a longitudinal length equal to or less than the longitudinal length of the first elongated member and the second elongated member.

The term H-shaped cross-section also includes other similar cross-sections such as I-shaped cross-sections. The elongated members may a monolithic, one-piece, or integral unit. In other embodiments, the elongated members may be formed from a plurality of separate components. For example, elongated members may be formed from back to back C-channels, formed from elongated plates, formed from an elongated plate and a plurality of elongated L-angles or T-bars, formed from a central square or a rectangular tube and elongated plates, etc.

Figure 6:
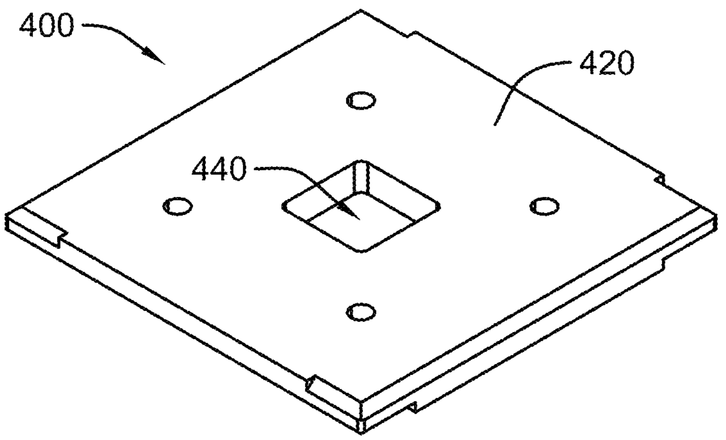
FIG. 6 is an enlarged top perspective view of the spacer or transition plate between the sections of the modular lighting fixture of FIG. 1, according to an embodiment of the present disclosure.
Figure 7:
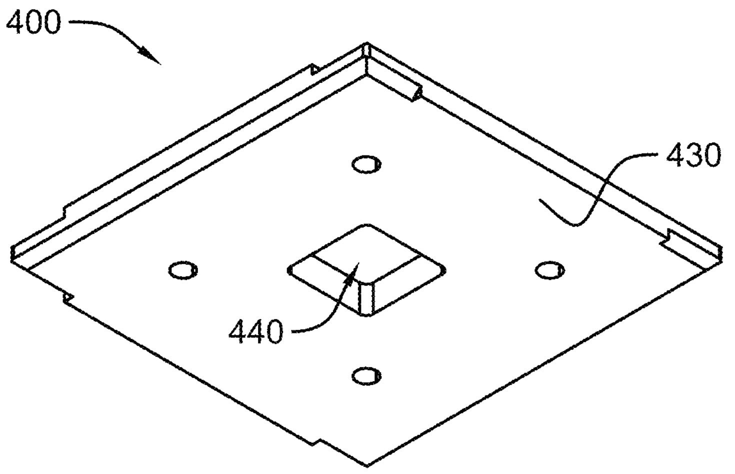
FIG. 7 is a bottom perspective view of the spacer or transition plate of FIG. 6, according to an embodiment of the present disclosure.

With reference again to FIGS. 1 and 2, a spacer or transition plate 400 may be operably disposed and attached between an upper end of main section 100 and a lower end of first section 200. A spacer or transition plate 400 may be operably disposed and attached between an upper end of first section 200 and a lower end of second section 30. As shown in FIGS. 6 and 7, spacer or transition plate 400 may include a first side 420 and a second side 430, according to an embodiment of the present disclosure. An aperture 440 may be disposed in the center of plate 410.

Figure 8:
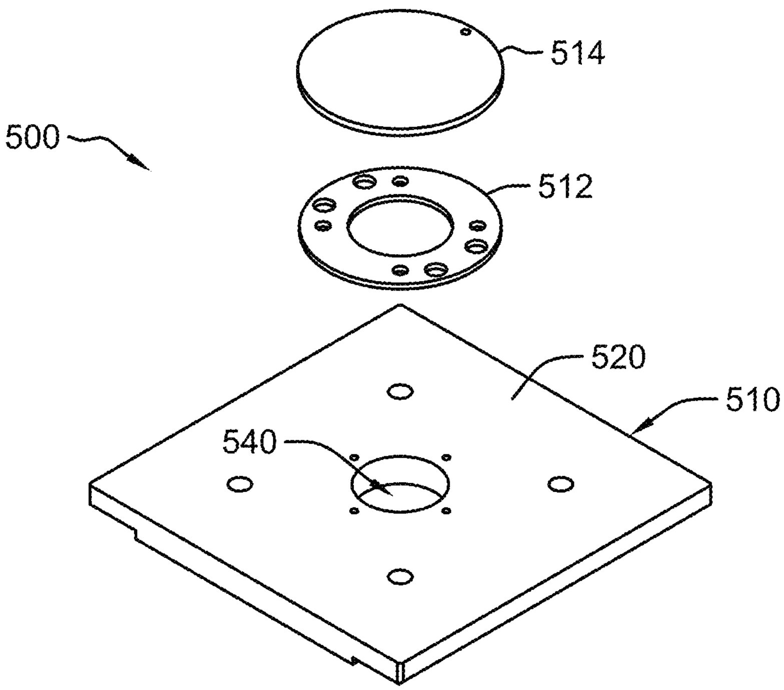
FIG. 8 is an enlarged top perspective view of the cap assembly of the modular lighting fixture of FIG. 1, according to an embodiment of the present disclosure.
Figure 9:
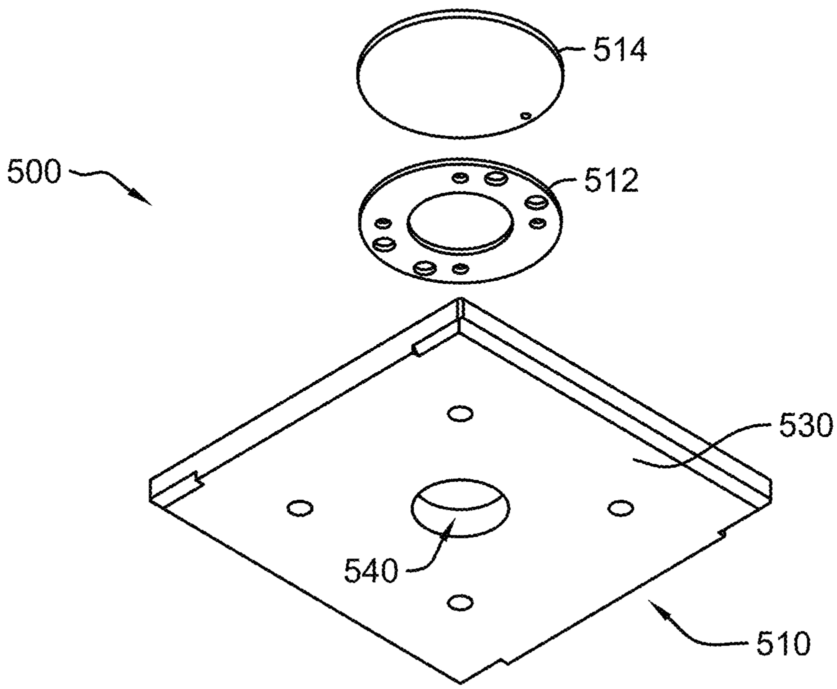
FIG. 9 is a bottom perspective view of the cap assembly of FIG. 8, according to an embodiment of the present disclosure.

With reference again to FIGS. 1 and 2, second section 300 may include a cap 500 operably disposed and attached to the upper end of second elongated member 310. As shown in FIGS. 8 and 9, cap 400 may include a plate 510, a gasket 512, and a disc 514, according to an embodiment of the present disclosure. Plate 510 may include a first side 520 and a second side 530. An aperture 540 may be disposed in the center of plate 510.

Figure 10:
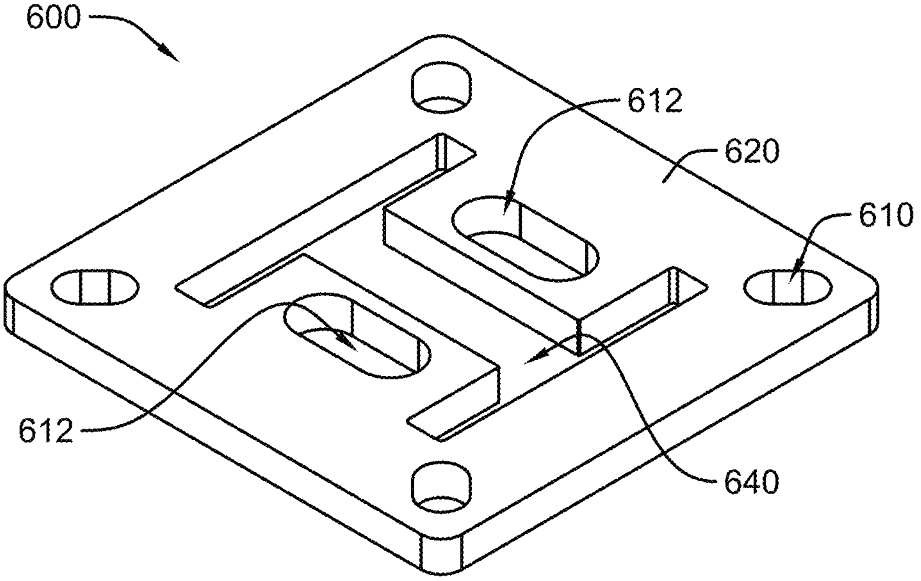
FIG. 10 an enlarged top perspective view of the base plate for the modular lighting fixture of FIG. 1, according to an embodiment of the present disclosure.
Figure 11:
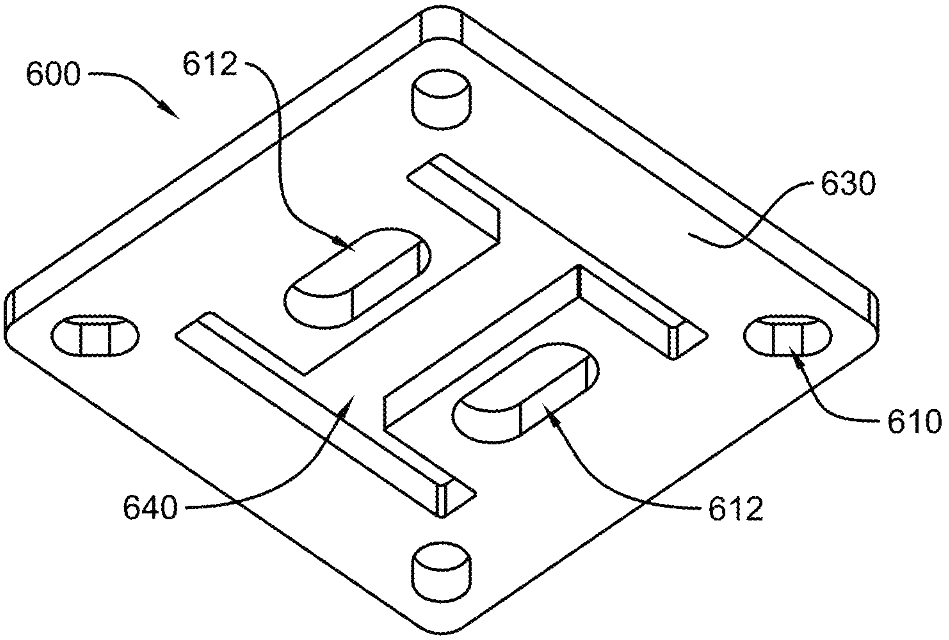
FIG. 11 is a bottom perspective view of the base plate of FIG. 10, according to an embodiment of the present disclosure.

FIGS. 10 and 11 illustrate a base plate 600, according to an embodiment of the present disclosure. Base plate 600 may include a first side 620 and a second side 630, an H-shaped opening 630 for receiving the H-shaped elongated member of the main section. Additional apertures 610 may be provided adjacent to the corners for attachment to the support structure such as the ground, concrete footer, walkway, etc. For example, the base plate may be mounted at grade with galvanized steel anchor bolts. Apertures 612 may be provided for receiving electrical wires operably connected to the power source and to the light sources.

Figure 12:
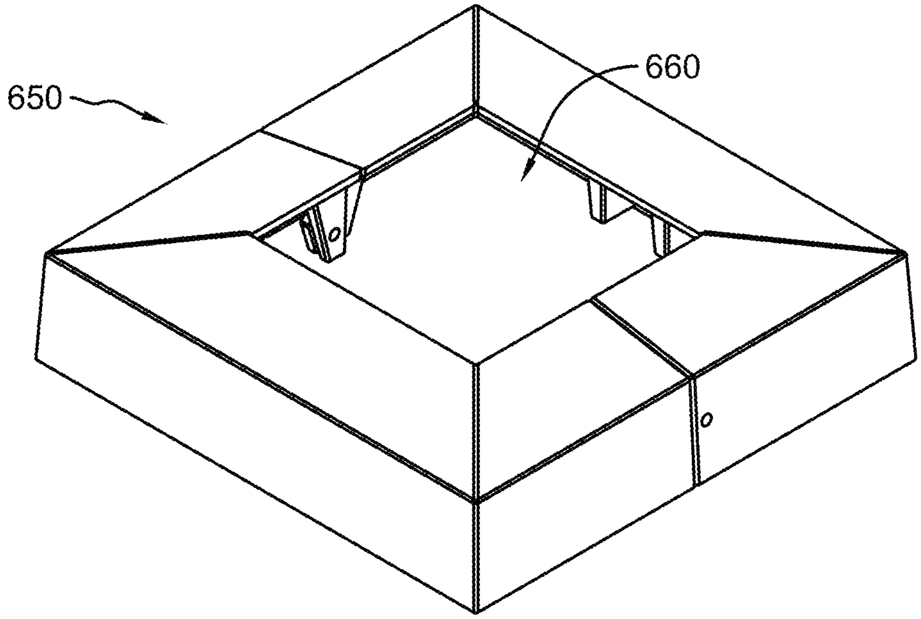
FIG. 12 an enlarged top perspective view of the base cover for the modular lighting fixture of FIG. 1, according to an embodiment of the present disclosure.
Figure 13:
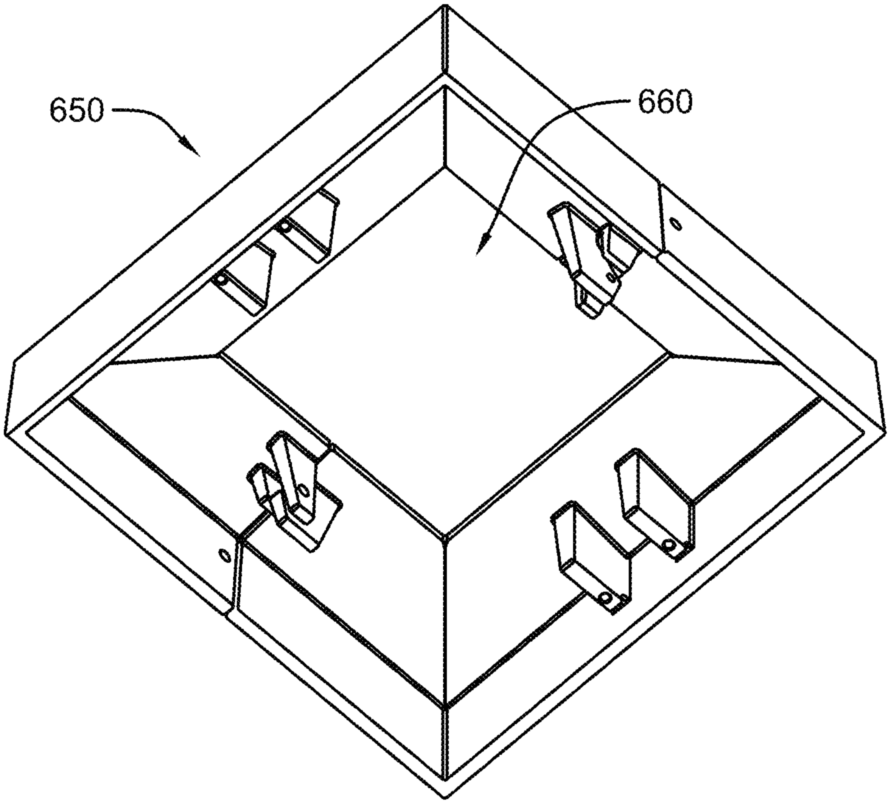
FIG. 13 is a bottom perspective view of the base cover of FIG. 12, according to an embodiment of the present disclosure.

FIGS. 12 and 13 illustrate a base cover 650, according to an embodiment of the present disclosure. Base cover 650 may be a two piece base cover that includes an opening 660, which is positionable around the lower portion of the main elongated section of the modular lighting fixture.

Figure 14:
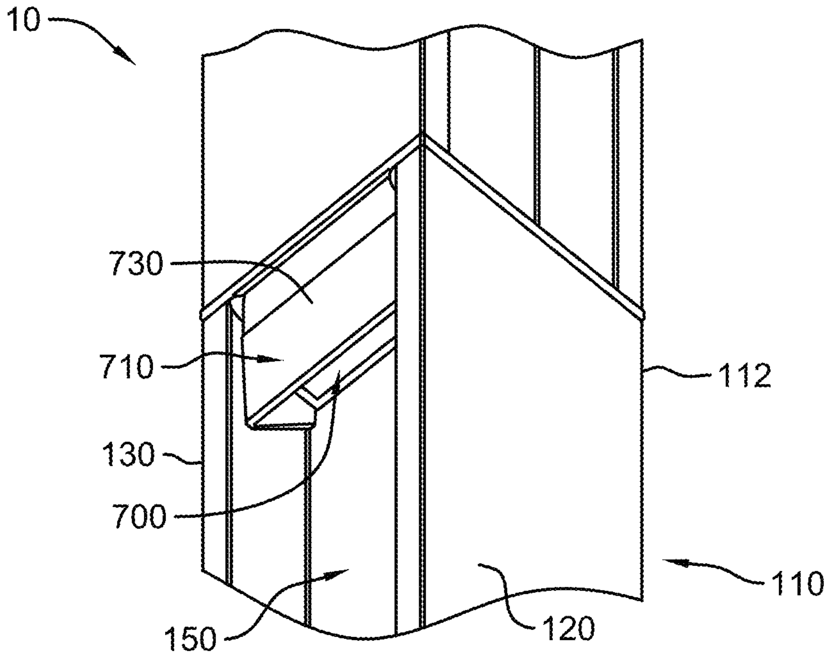
FIG. 14 is an enlarged perspective view of a portion of the modular lighting fixture and the accent light source of FIG. 1, according to an embodiment of the present disclosure.
Figure 15:
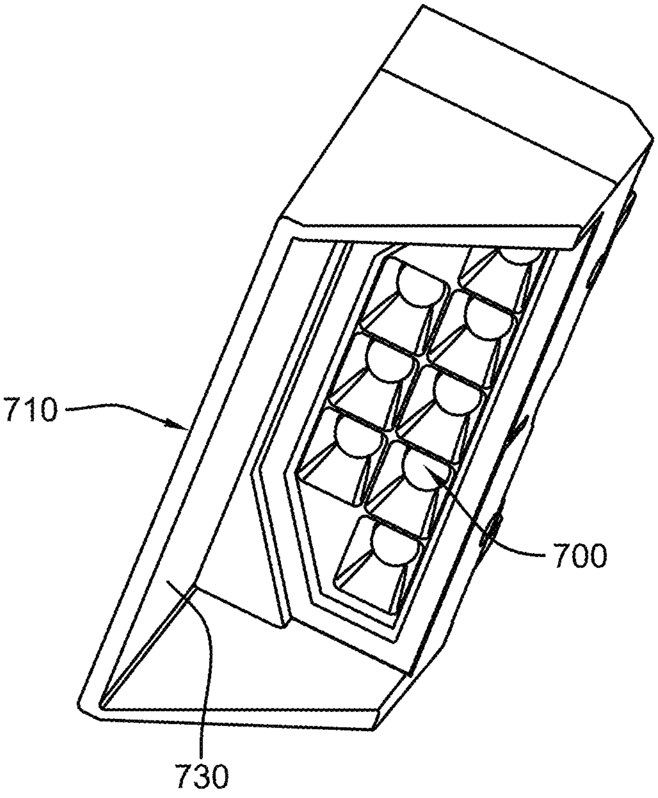
FIG. 15 is an enlarged perspective view of the accent light source of FIG. 14, according to an embodiment of the present disclosure.

FIGS. 14 and 15 illustrate one of light sources 700 of modular lighting fixture (FIG. 1), according to an embodiment of the present disclosure. In this illustrated embodiment, light source 700 may be disposed in a housing 710. At least one light source 700 may be operably attached to upper portion 112 of elongated member 110. For example, light source 700 may be disposed adjacent to upper portion 112 of elongated member 110 and entirely within first main channel 150. Illuminated light A1 (FIG. 1) from light source 700 may be directed downwardly along first main channel 150 of main elongated member 110. Housing 710 may include a shield 730 aligned generally with the ends of flanges 120 and 130 for obscuring light from view by an observer standing on the ground away from the modular lighting fixture.

With reference again to FIGS. 1 and 2, modular lighting fixture 10 in main section 100 may include at least two main light sources, e.g., main light source 700 (FIG. 1) disposed entirely within the first main channel 150 of main elongated member 110, and main light source 700 (FIG. 2) disposed entirely within the second main channel 160 of main elongated member 110.

As shown in FIG. 1, in this illustrated embodiment, in first upper section 200 at least one light source 700 may be disposed in the housing and attached to upper portion 212 of first elongated member 210. For example, light source 700 may be disposed adjacent to upper portion 212 of first elongated member 210 and entirely within first main channel 250. Illuminated light A2 from light source 600 may be directed downwardly along first channel 250 of elongated member 210. The housing 710 (FIG. 14) may include shield 730 (FIG. 14) aligned with the ends of the flanges for obscuring light from view by an observer standing on the ground away from the modular lighting fixture. In some embodiments, first upper section 200 may include at least two light sources, one light source 700 (FIG. 1) disposed entirely within the first channel 250 of first elongated member 210, and one light source 700 (FIG. 2) disposed entirely within the second channel 260 of first elongated member 210.

At least one light source 700 in second upper section 300 may also be disposed in the housing and attached to upper portion 312 of second elongated member 310. For example, light source 700 may be disposed adjacent to upper portion 312 of second elongated member 310 and entirely within first main channel 350. Illuminated light A3 from light source 700 may be directed downwardly along first channel 350 of elongated member 310. The housing 710 (FIG. 14) may include shield 730 (FIG. 14) aligned with the ends of the flanges for obscuring light from view by an observer standing on the ground away from the modular lighting fixture. In some embodiments, second upper section 300 may include at least two light sources, one light source 700 (FIG. 1) disposed entirely within the first channel 350 of second elongated member 310, and one light source 700 (FIG. 2) disposed entirely within the second channel 360 of second elongated member 310.

Figure 16:
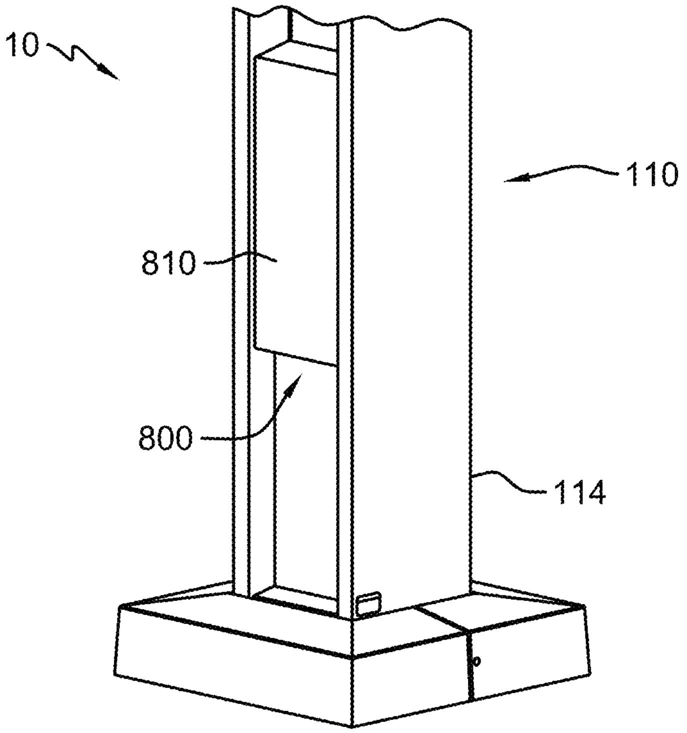
FIG. 16 is an enlarged partial perspective view of the base of the modular lighting fixture, footer housing, and footer light source of FIG. 1, according to an embodiment of the present disclosure.
Figure 17:
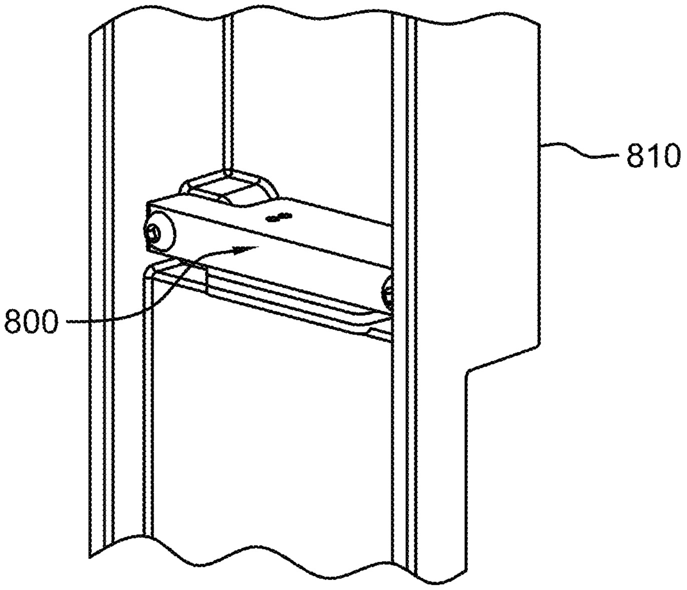
FIG. 17 is an enlarged, partial rear perspective view of the footer housing and footer light source of FIG. 16, according to an embodiment of the present disclosure.

As shown in FIG. 16, modular lighting fixture 10 in main section 100 may include a footer light source 800 attached to lower portion 114 of main elongated member 110, according to an embodiment of the present disclosure. As shown in FIG. 17, footer light source 800 may be disposed in a housing 810. As shown in FIG. 1, light from footer light source 800 may be directed downwardly along the first channel 150 of main elongated member 110.

Figure 18:
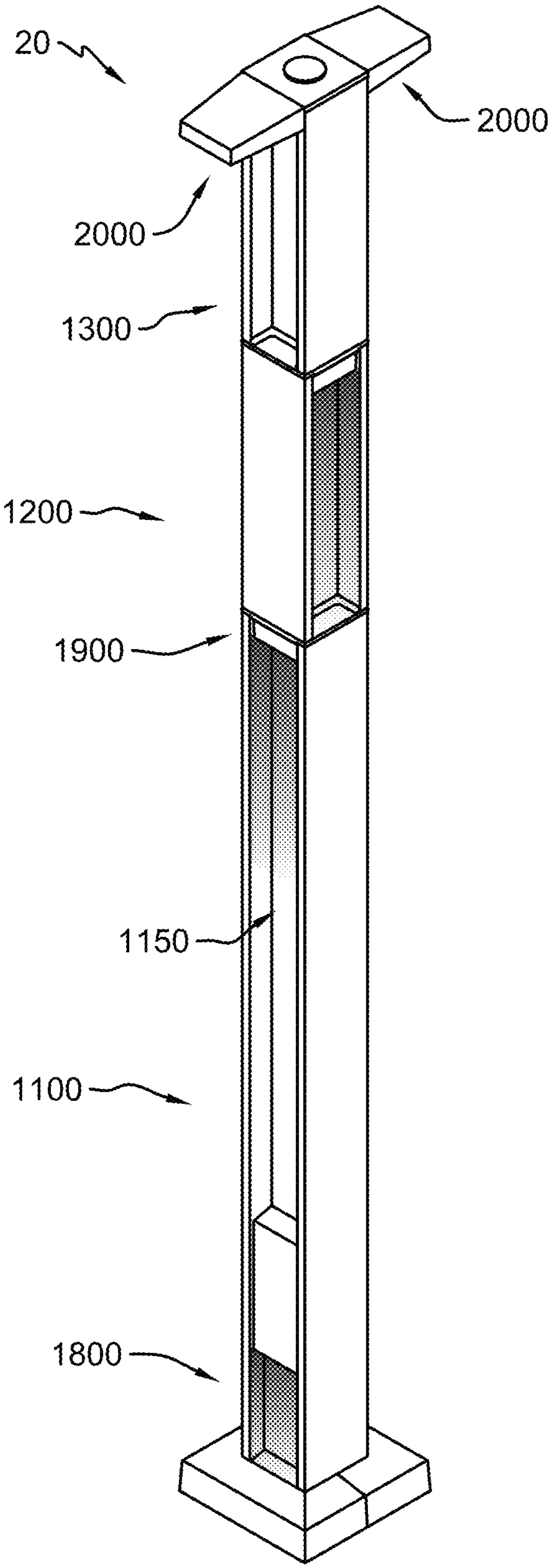
FIG. 18 is a front right perspective view of a modular lighting fixture having a plurality of sections with grazing light sources and area light sources, according to an embodiment of the present disclosure.
Figure 19:
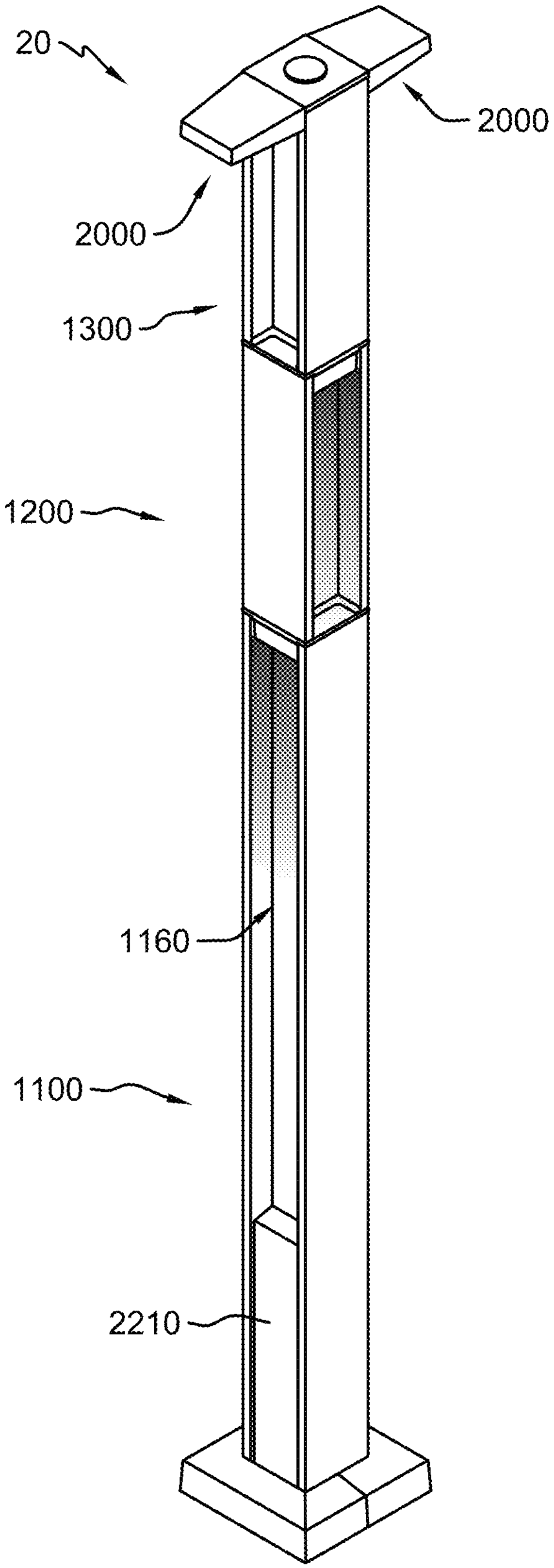
FIG. 19 is a rear left perspective view of the modular lighting fixture of FIG. 18, according to an embodiment of the present disclosure.

FIG. 18 illustrates a front right perspective view and FIG. 19 illustrates a rear left perspective view of a modular lighting fixture 20 attached to a support structure such as the ground, walkway, etc., according to an embodiment of the present disclosure. For example, illustrated modular lighting fixture 20 may generally include a main section 1100, a first upper section 1200, a second upper section 1300. The sections may operably include a plurality of grazing light sources 1900, a footer light source 1800, and at least one area light source 2000. The assembled modular lighting fixture may be disposed in a vertical orientation.

As illustrated in FIGS. 18 and 19, grazing light sources 1900 may be disposed in upper portions of the main section 1100 and in first upper section 1200 to illuminate portions of the main section 1100 and first upper section 1200. For example, grazing light sources 1900 may illuminate the recessed compartmentalized portions of main section and first upper sections 1200 as well as project light outwardly from the modular lighting fixture 20. Second upper section 300 may include area light sources 2000 that extend outwardly from modular lighting fixture 20 and provide area lighting.

Figure 20:
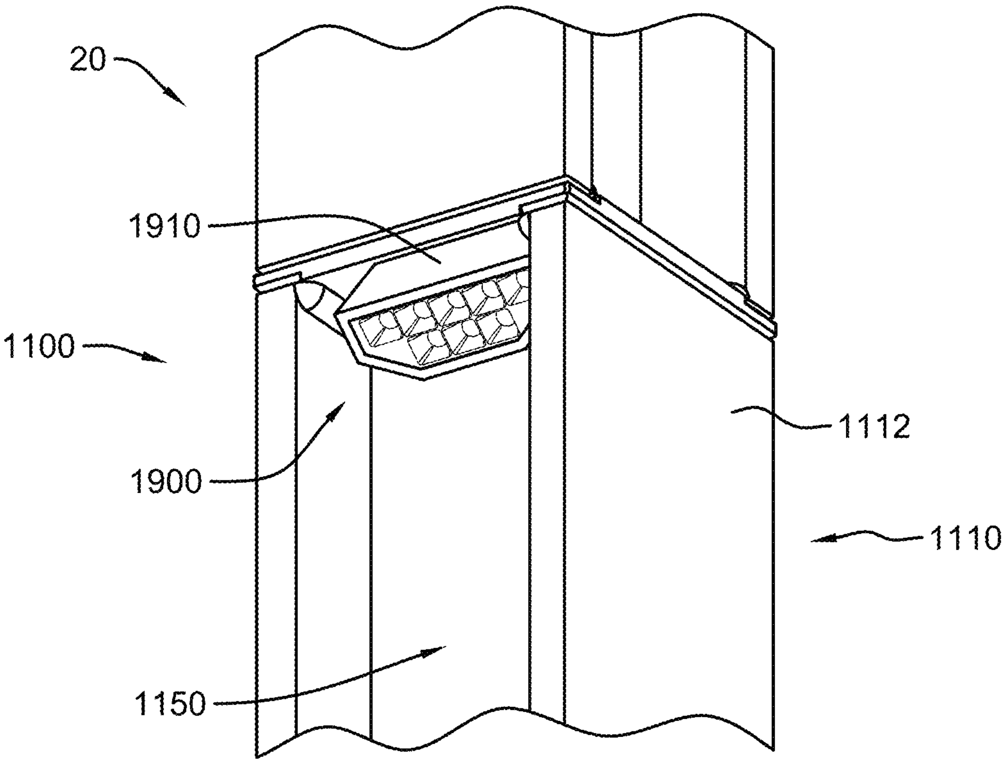
FIG. 20 is an enlarged perspective view of a portion of the modular lighting fixture and the grazing light source of FIG. 18, according to an embodiment of the present disclosure.
Figure 21:
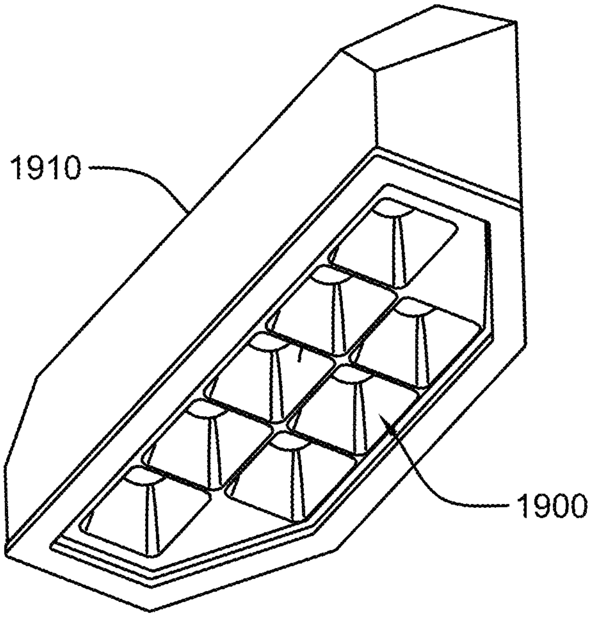
FIG. 21 is an enlarged perspective view of the grazing light source of FIG. 20, according to an embodiment of the present disclosure.

FIGS. 20 and 21 illustrate one of light sources 1900 of modular lighting fixture according to an embodiment of the present disclosure. In this illustrated embodiment, grazing light source 1900 may be disposed in a housing 1910. Light source 1900 may be attached to upper portion 1112 of an elongated member 1110. For example, light source 1900 may be disposed adjacent to upper portion 1112 of elongated member section 1110, entirely within first main channel 1150, and at an angle facing outwardly from main section 1100. A portion of illuminated light from grazing light source 1900 may be directed downwardly along first main channel 1150 of main elongated member 1110 and a portion of the illuminated light may be directed outwardly from main section 1100.

Figure 22:
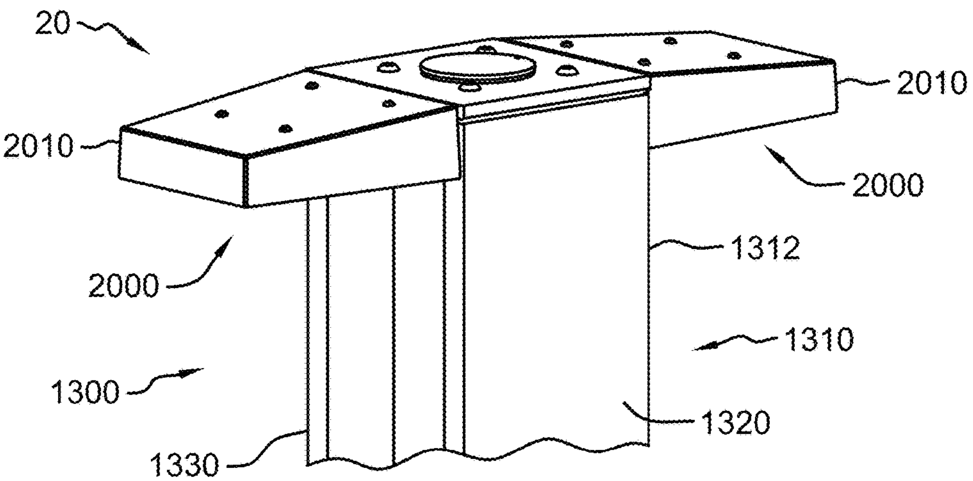
FIG. 22 is an enlarged perspective view of a portion of the modular lighting fixture and the area light sources of FIG. 18, according to an embodiment of the present disclosure.
Figure 23:
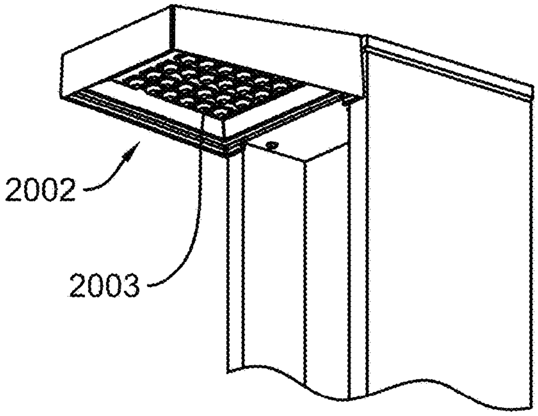
FIG. 23 is a bottom perspective view of an area light source, according to an embodiment of the present disclosure.
Figure 24:
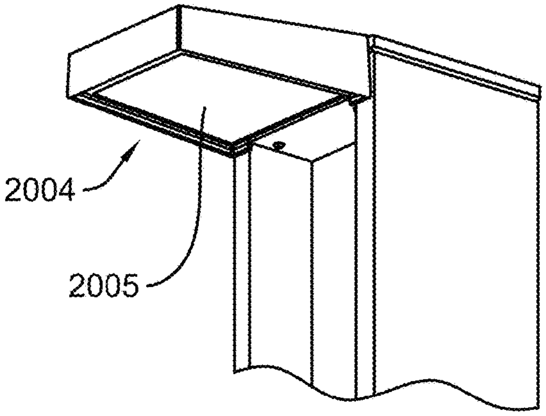
FIG. 24 is a bottom perspective view of an area light source, according to an embodiment of the present disclosure.

As shown in FIG. 22, modular lighting fixture 20 (FIG. 1) may include at least two area light sources, e.g., area light source 2000 disposed in a housing 2010 positioned adjacent to upper portion 1312 of second upper section 1300 and extending outwardly from a first side of second elongated member 1310 between first flange 1320 and second flange 1330 of elongated member 1310, and area light source 2000 disposed in a housing 2010 positioned adjacent to upper portion 1312 of second upper section 1300 and extending outwardly from a second side of second elongated member 1310 between first flange 1320 and second flange 1330 of elongated member 1310. In some embodiments, as shown in FIG. 23, the area light source may be an area light source 2002 having a plurality of lenses 2003 for directing the illuminated light. In other embodiments, as shown in FIG. 24, the area light source may be an area light source 2004 having a diffuser 2005 for diffusing the illuminated light.

Figure 25:
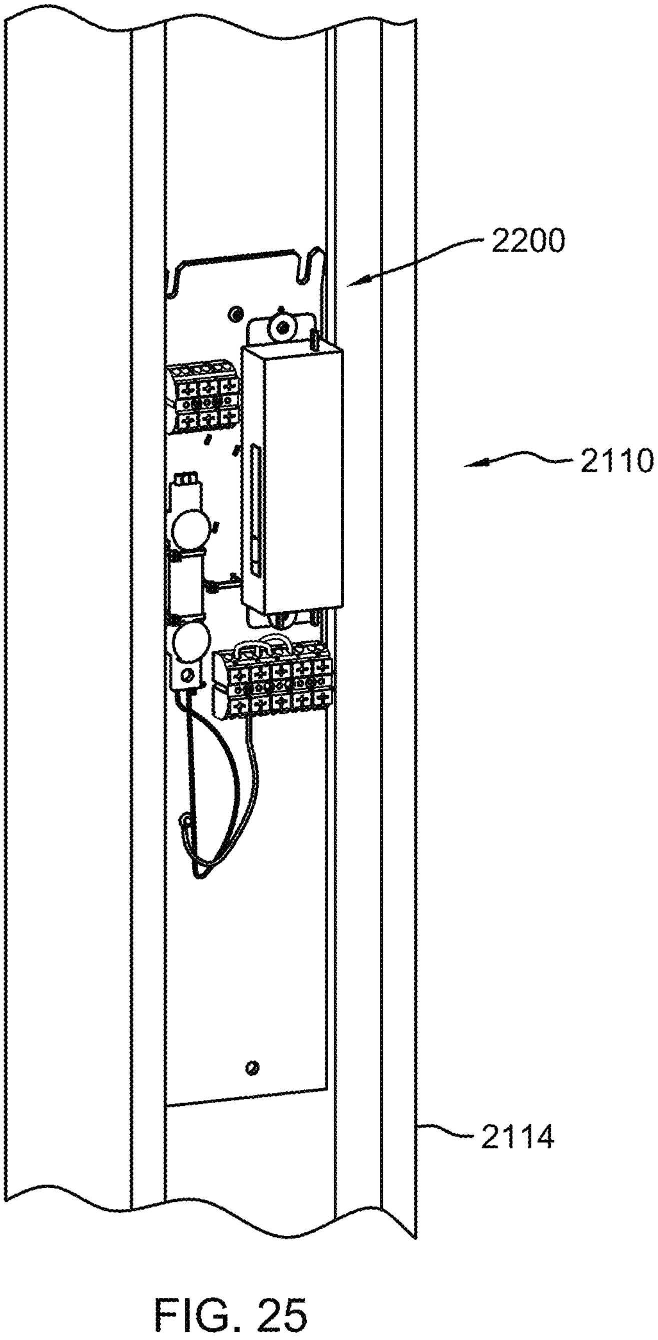
FIG. 25 is a perspective view of the lower portion of the modular lighting fixture of FIG. 19 with the driver cover removed, according to an embodiment of the present disclosure.
Figure 26:
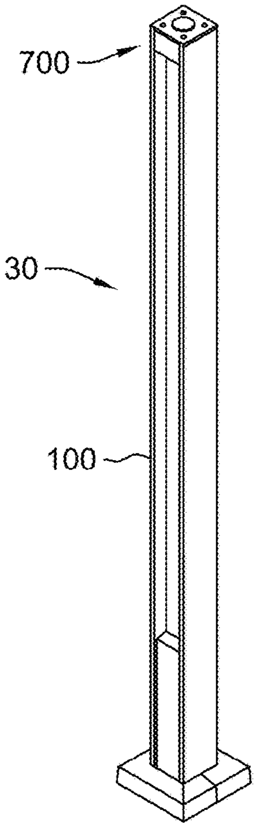
FIGS. 26-29 are perspective views of modular lighting fixtures having a single main section with one or more light sources, according to embodiments of the present disclosure.
Figure 27:
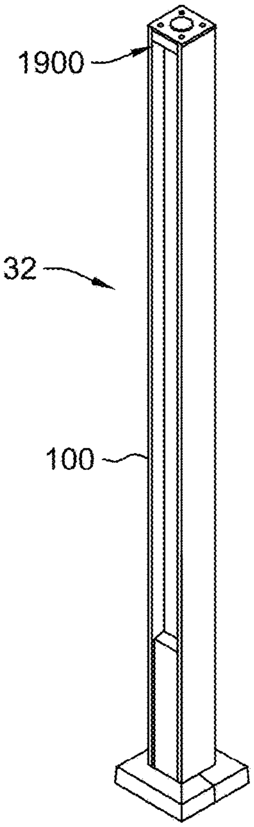
Figure 28:
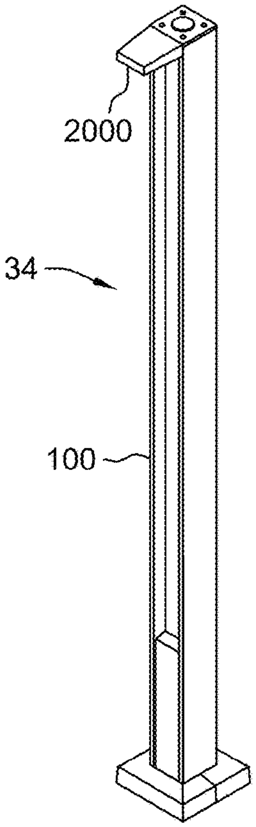
Figure 29:
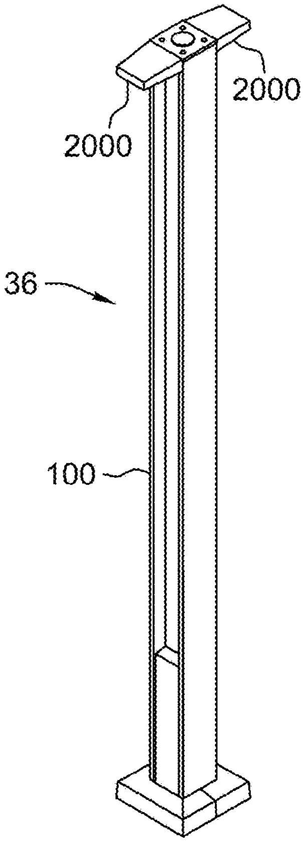
Figure 30:
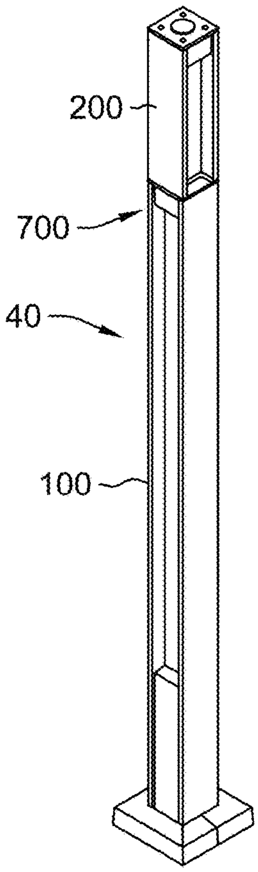
FIGS. 30-33 are perspective views of modular lighting fixtures having a main section and a single upper section with one or more light sources, according to embodiments of the present disclosure.
Figure 31:
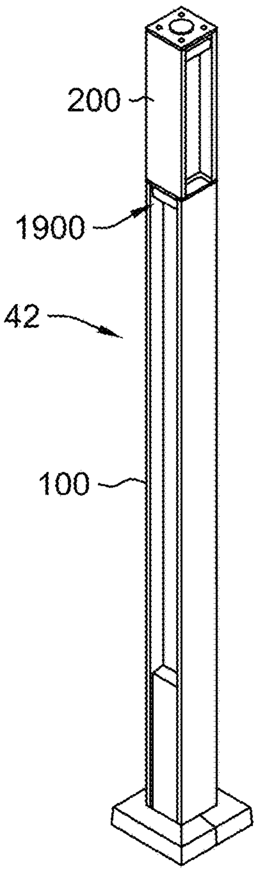
Figure 32:
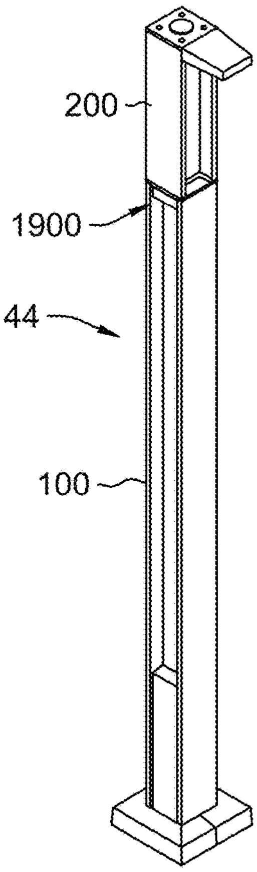
Figure 33:
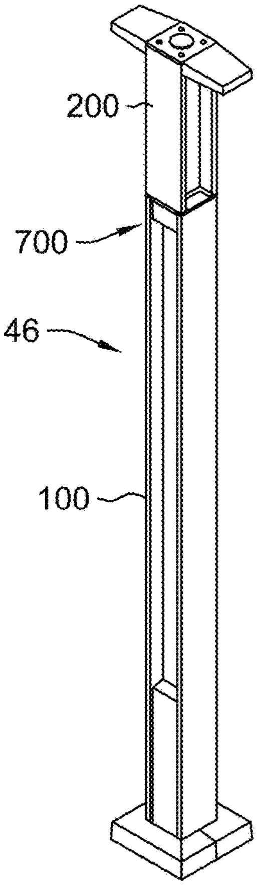
Figure 34:
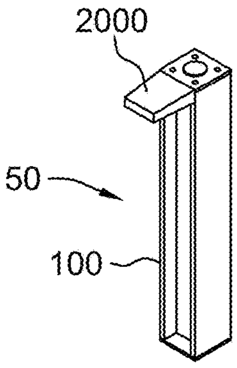
FIGS. 34-37 are perspective views of modular lighting fixtures configured as path lights and bollards having a single section with one or more light sources, according to embodiments of the present disclosure.
Figure 35:
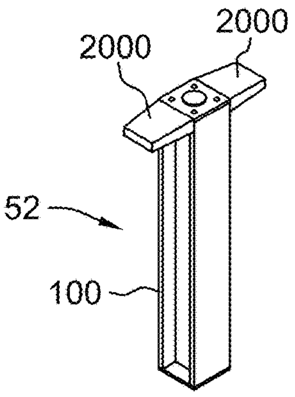
Figure 36:
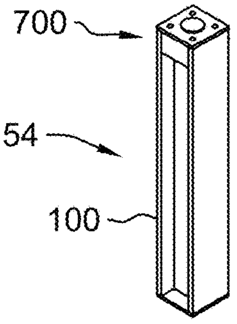
Figure 37:
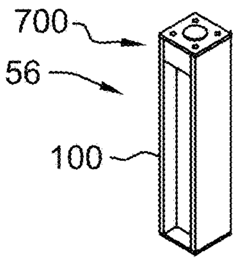

FIG. 25 illustrates a driver 2200 disposed in a housing 2210 (FIG. 19) positioned in the lower portion 2114 of main section 2110, according to an embodiment of the present disclosure. In the various embodiments, electrical power may typically be provided to the modular lighting fixtures via electrical wires or cables such as conventional 120 or 240 volt AC power from the local electrical grid, though one or more batteries or rechargeable batteries may be located in the modular lighting fixtures. Where the light sources include LEDs, a power supply may be adapted to convert supply voltage, for example, 120 or 240 VAC, to an appropriate voltage for powering the light sources, for example, about 5 to about 50 VDC, or other suitable voltage. Wires may run from the base of the modular lighting fixture to provide electrical current from the power supply to the light sources.

In some embodiments, the modular lighting fixtures may include a surge protected 120V through 277V, 50/60 Hz electronic driver, 0-10V dimming, −40 degrees Celsius start temperature. A cast aluminum housing or driver compartment doors with weather-tight seal assembly may be located at bottom of the modular lighting fixture. The modular lighting fixtures may also include an ANSI C136.41 twist lock receptacle. Modular lighting fixture 10 (FIGS. 1 and 2) may similarly include a driver and driver housing 2210.

FIGS. 26-29 illustrate additional assembled modular lighting fixtures, according to embodiments of the present disclosure. For example, as shown in FIGS. 26-29, assembled modular lighting fixtures 30, 32, 34, and 36 may include a single section 100. Modular lighting fixture 30 may include one or two accent light sources 700, modular lighting fixture 32 may include one or two grazing light sources 1900, modular lighting fixture 34 may include one area light source 2000, and modular lighting fixture 36 may include two area light sources 2000.

FIGS. 30-33 illustrate additional assembled modular lighting fixtures, according to embodiments of the present disclosure. For example, as shown in FIGS. assembled modular lighting fixtures 40, 42, 44, and 46 may include a main section 100 and a single upper section 200. Modular lighting fixture 40 may include one or two accent light sources 700, modular lighting fixture 42 may include one or two grazing light sources 1900, modular lighting fixture 44 may include one or two accent light sources 1900 and one area light source 2000, and modular lighting fixture 46 may include one or two accent light sources 700 and two area light sources 2000.

FIGS. 34-37 illustrate modular lighting fixtures configured as bollards or path lights, according to embodiments of the present disclosure. As shown in FIGS. 34-37, modular lighting fixture 50 may include a single section 100 with one area light source 2000, modular lighting fixture 52 may include a single section 100 with one or two grazing light sources 1900, modular lighting fixture 54 may include a single section 100 with one accent light source 700, and modular lighting fixture 56 may include a single section 100 with two accent light sources 2000. The lighting fixture defining bollards or path lights may have a longitudinal length between 2 and 4 feet. For example, modular lighting fixtures 50, 52, and 54 may have a height of about 3 feet, and modular lighting fixture 56 may have a height of about 2 feet. An operable driver (not shown) may be housed along the back of the bollards or path lights.

It will be appreciated that in the above modular lighting fixtures, one or more of the area light sources may be replaced with one or the other of the grazing light sources 1900 or the accent light sources 700. One or more of the grazing light sources 1900 may be replaced with the accent light sources 700, and one or more of the grazing light sources 1900 may be replaced with the accent light 700. Footer lights may also be included in the various designs. It will be appreciated that any of the main sections, first upper sections, and the second upper sections need not include a light source.

In some embodiments, the main section, the first upper section, and the second upper section may have the same longitudinal length. Further embodiments may include more than three sections. For example, modular lighting fixtures of the present disclosures may include four, five, six or more sections. Some of the sections may or may not be rotated 90 degrees relative to adjacent sections.

Figure 38:
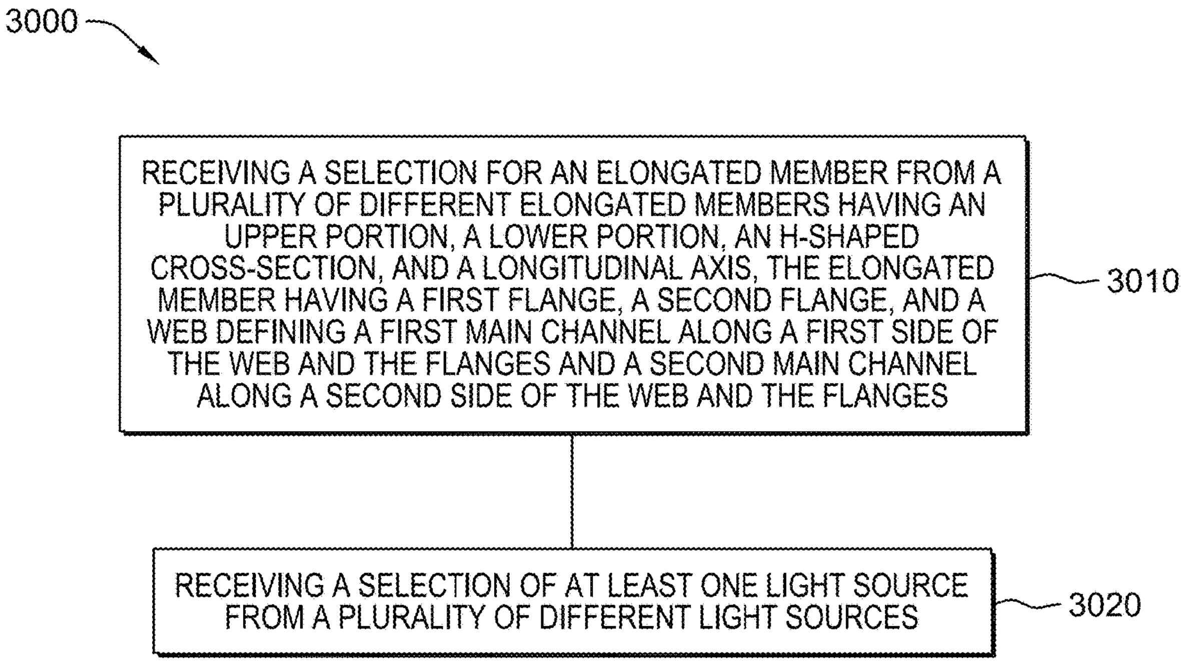
FIG. 38 is a flowchart of a method for use in forming a modular lighting fixture, according to an embodiment of the present disclosure.

FIG. 38 illustrates a method 3000 for use in forming a modular lighting fixture, according to an embodiment of the present disclosure. In this illustrated embodiment, method 3000 may include at 3010 receiving a selection for an elongated member from a plurality of different elongated members having an upper portion, a lower portion, an H-shaped cross-section, a longitudinal axis, the section having a first flange, a second flange, and a web defining a first main channel along a first side of the web and the flanges and a second channel along a second side of the web and the flanges, and at 3020 receiving a selection of at least one light source from a plurality of different light sources.

Figure 39:
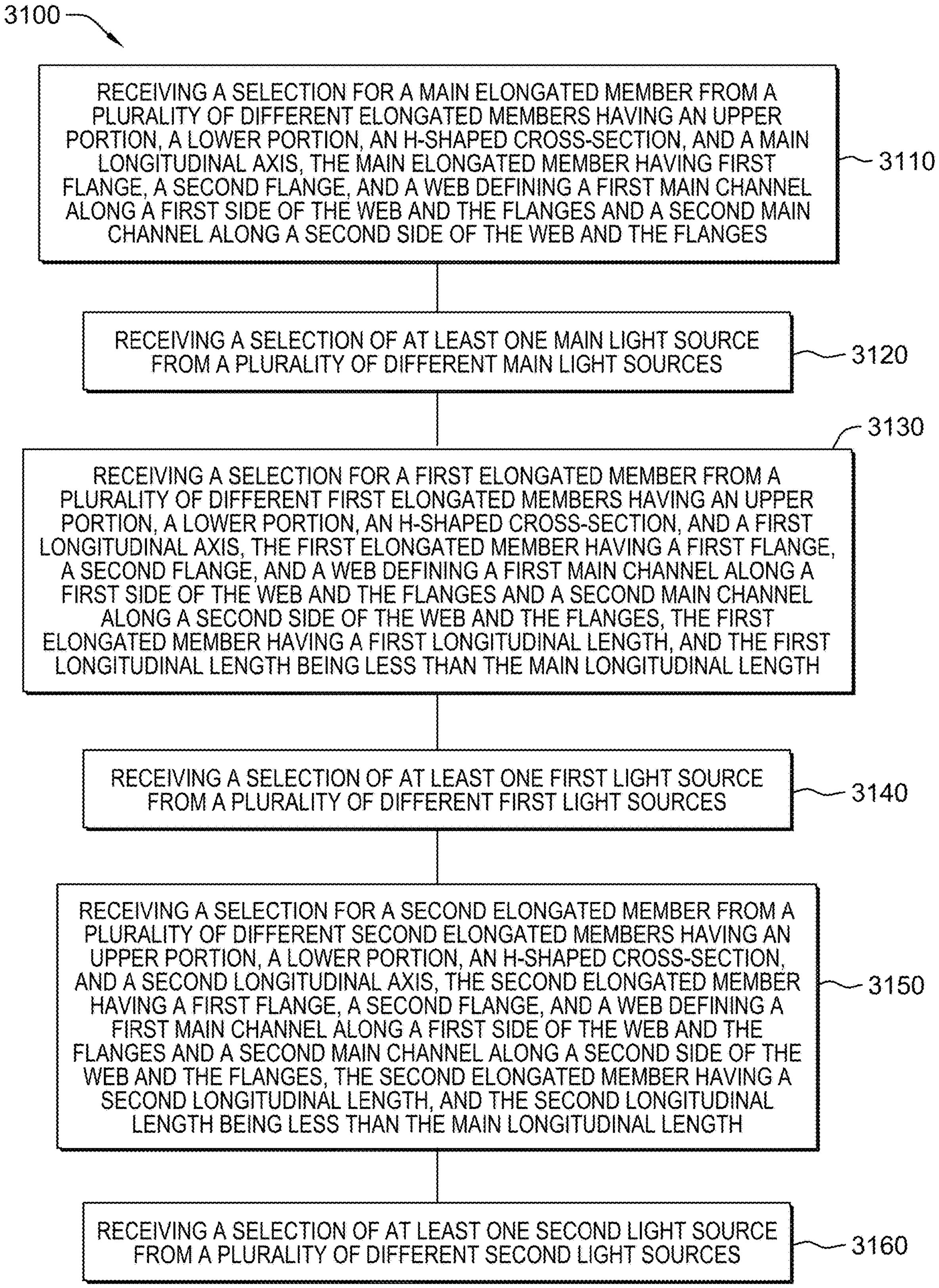
FIG. 39 is a flowchart of a method for use in forming a modular lighting fixture, according to an embodiment of the present disclosure.

FIG. 39 illustrates a method 3100 for use in forming a modular lighting fixture, according to an embodiment of the present disclosure. In this illustrated embodiment, method 3100 may include at 3110 receiving a selection for a main elongated member from a plurality of different main elongated members having an upper portion, a lower portion, an H-shaped cross-section, a main longitudinal axis, the main section includes a first flange, a second flange, and a web defining a first main channel along a first side of the web and the flanges and a second main channel along a second side of the web and the flanges, and at 3120 receiving a selection of at least one main light source from a plurality of different main light sources. Method 3100 may further include at 3130 receiving a selection for a first elongated member from a plurality of different first elongated members having an upper portion, a lower portion, an H-shaped cross-section, a first longitudinal axis, the first upper section having a first flange, a second flange, and a web defining a first main channel along a first side of the web and the flanges and a second main channel along a second side of the web and the flanges, the first upper section having a first longitudinal length, and the first longitudinal length being less than the main longitudinal length, at 3140 receiving a selection of at least one first light source from a plurality of different first light sources, at 3150 receiving a selection for a second upper section from a plurality of different second upper sections having a first elongated member having an upper portion, a lower portion, an H-shaped cross-section, a second longitudinal axis, the second upper section includes a first flange, a second flange, and a web defining a first main channel along a first side of the web and the flanges and a second main channel along a second side of the web and the flanges, the second upper section having a second longitudinal length, and the second longitudinal length being less than the main longitudinal length, and at 3160 receiving a selection of at least one second light source from a plurality of different second light sources.

Figure 40:
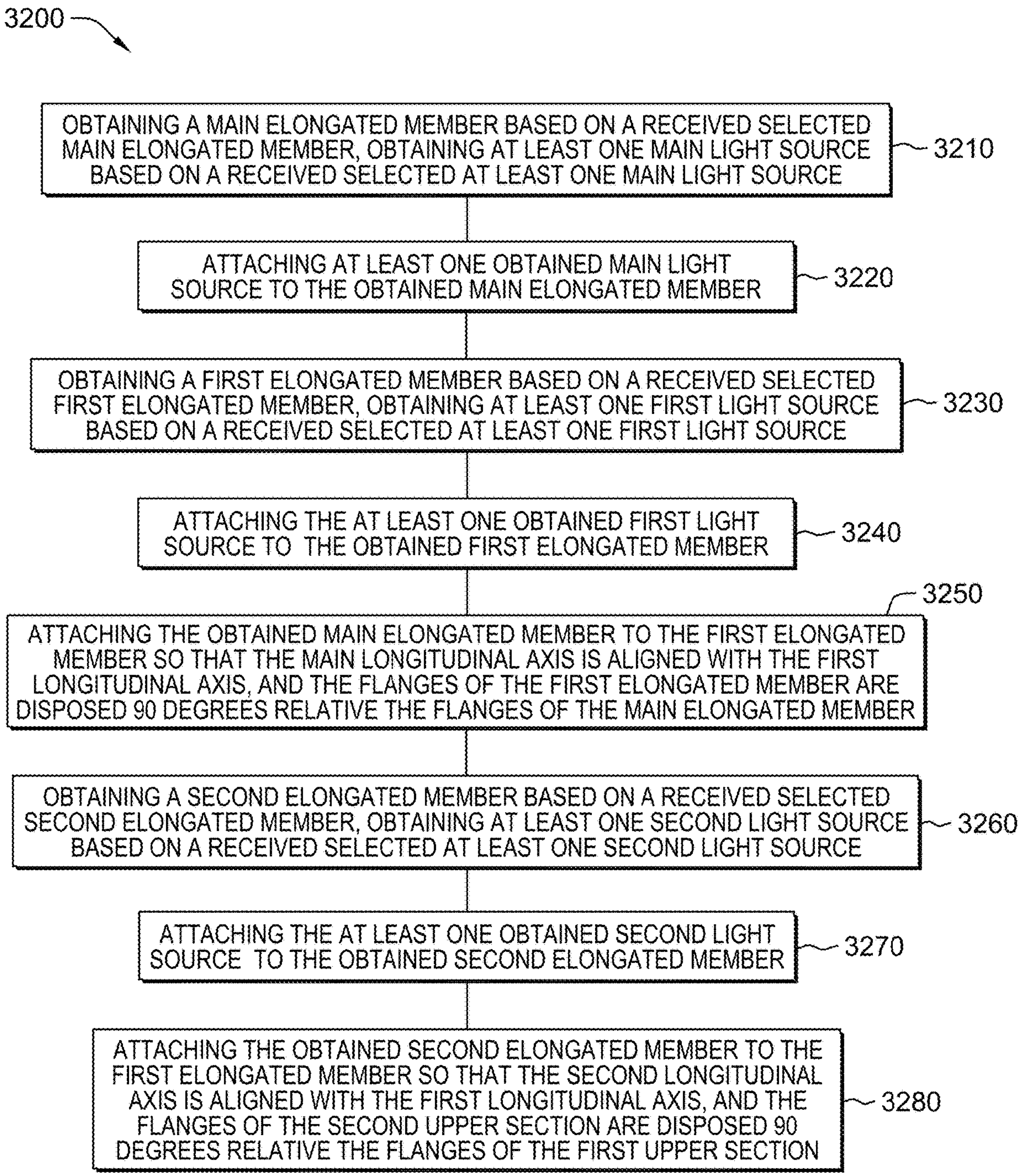
FIG. 40 is a flowchart of a method for assembling a modular lighting fixture, according to an embodiment of the present disclosure.

FIG. 40 illustrates a method 3200 for use in forming a modular lighting fixture, according to an embodiment of the present disclosure. In this illustrated embodiment, method 3200 may include at 3210 obtaining a main elongated member based on a received selected main elongated member and obtaining at least one main light source based on a received selected at least one main light source, at 3220 attaching at least one obtained main light source to the obtained main elongated member, at 3230 obtaining a first elongated member based on a received selected first elongated member and obtaining at least one first light source based on a received selected at least one first light source, at 3240 attaching the at least one obtained first light source to the obtained first elongated member, at 3250 attaching the obtained main elongated member to the first elongated member so that the main longitudinal axis is coaxially aligned with the first longitudinal axis, and the flanges of the first elongated member are disposed 90 degrees relative the flanges of the main elongated member, at 3260 obtaining a second elongated member based on a received selected second elongated member, obtaining at least one second light source based on a received selected at least one second light source, at 3270 attaching the at least one obtained second light source to the obtained second elongated member, and at 3280 attaching the obtained second elongated member to the first elongated member so that the second longitudinal axis is aligned with the first longitudinal axis, and the flanges of the second elongated member are disposed 90 degrees relative the flanges of the first elongated member.

It will be appreciated that in the various methods, users, customers, or purchasers of the modular lighting fixtures may place an order for manufacture by selecting the various components described above. The elongated members, spacers, and base plate may be operably attached, e.g., by welding to form a single, monolithic, or integral elongated structure or pole. The elongated structure or pole with the attached lighting components, drivers, and wiring of the present disclosure may be prefabricated under manufacturing conditions and quality control thereby assuring accuracy and economy.

In the various embodiments, the elongated members of the main section and the upper sections may include an H-shaped cross-section fabricated from a metallic material such as aluminum, or other suitable material or materials. For example, the elongated members may be formed from an aluminum extrusion and may include a hollow H-shaped aluminum extrusion. The housing for the light sources and the base cover may be fabricated from a metallic material such as aluminum, or other suitable material or materials.

For the modular lighting fixtures defining elongated pole configurations with or without the first or second upper sections, the main elongated member may have a length greater than 8 feet and less than 20 feet, and may include selectable sizes of about 9 feet, about 10 feet, about 12 feet, about 14 feet, and about 16 feet. The first and second upper sections may include elongated member having a length between about 2 feet and about 3 feet, about 2 feet, about 3 feet, or other suitable length. For example, a 12 foot main elongated member can be specified with one or more 2 foot elongated members with a total height of about 16 about.

The lights such as the area light sources, accent light sources, grazing light sources, and footer light sources may include housings fabricated from a metallic material such as aluminum, or other suitable material or materials. The light sources may include an LED cartridge.

In some embodiments, the area light sources may have a die-cast aluminum housing with a replaceable LED cartridge with die-cast aluminum heatsink, high power LEDs on RoHS compliant circuit board, and secondary optics. The area light sources may be sealed, UV stable, impact modified frosted or clear acrylic lens. The area light sources may be mounted to the modular lighting fixtures with magni-coated hardware or other suitable fasteners.

The accent light sources and grazing light sources may have a replaceable LED cartridge that consists of a die-cast aluminum body with high power LEDs on RoHS compliant circuit board, secondary optics, and injection molded cutoff baffle. Sealed, UV stable, impact modified clear acrylic lens. The accent light sources and grazing light sources may be mounted to the modular lighting fixtures with magni-coated hardware or other suitable fasteners.

The footer light source may include a replaceable LED cartridge having a machined aluminum body with high power LED on RoHS compliant circuit board. The footer light sources may include a sealed, UV stable, impact modified diffused acrylic lens. The footer light sources may be mounted to the driver compartment door with magni-coated hardware or other suitable fasteners.

Figure 41:
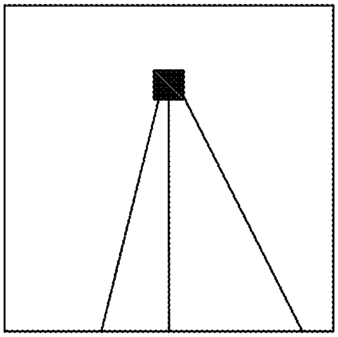
FIG. 41 is a graphical representation of the light distribution for an accent light source, according to an embodiment of the present disclosure.
Figure 42:
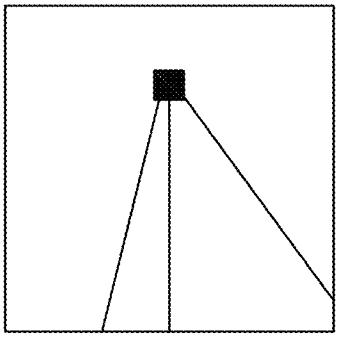
FIG. 42 is a graphical representation of the light distribution for a grazing light source, according to an embodiment of the present disclosure.
Figure 43:
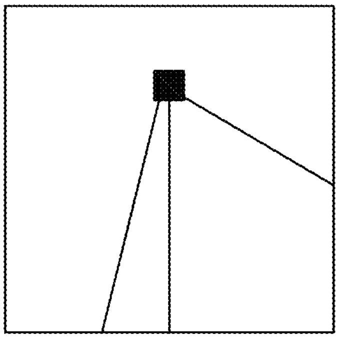
FIG. 43 is a graphical representation of the light distribution for an area light source, according to an embodiment of the present disclosure.

The lighting engines may be available in 2700K, 3000K, 3500K, and 4000K color temperature, and may be greater than 80CRI across all available color temperatures. FIG. 41 illustrates a Type II light distribution for the accent light sources, FIG. 42 illustrates a Type III light distribution for the grazing light sources. FIG. 43 illustrates a Type IV light distribution for the area light sources. The light sources may be standard or high output, clear or diffused lens, and optional twist lock receptacle.

Figure 44:
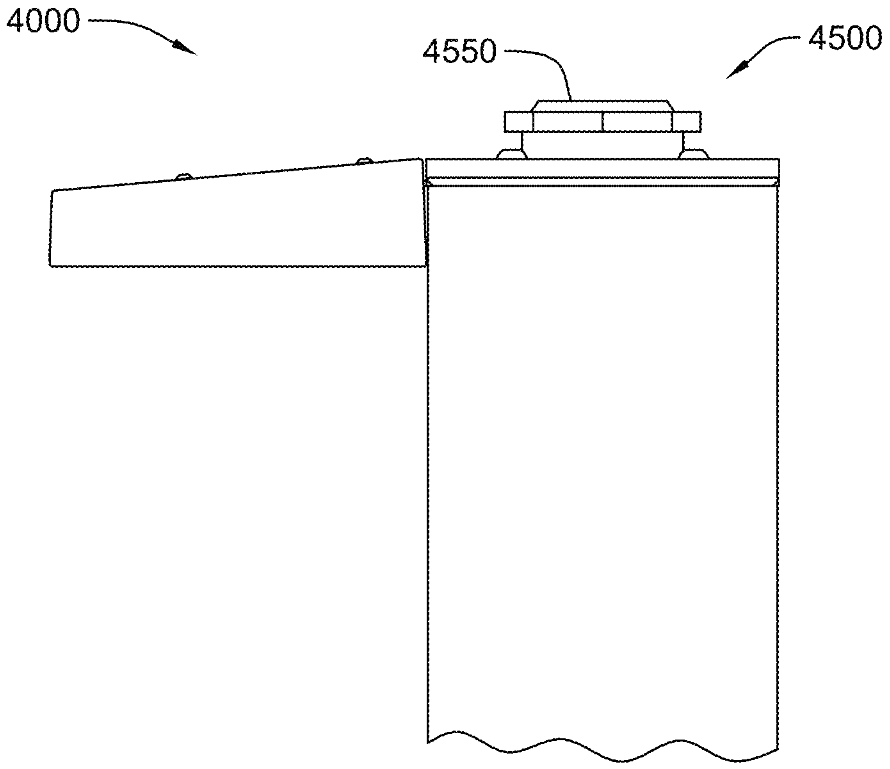
FIG. 44 is a side elevational view of an upper portion of a modular lighting fixture having cap with a twist lock receptacle, according to an embodiment of the present disclosure.

FIG. 44 illustrates a modular lighting fixture having cap 4500 with a twist lock receptacle 4550, according to an embodiment of the present disclosure.

Figure 45:
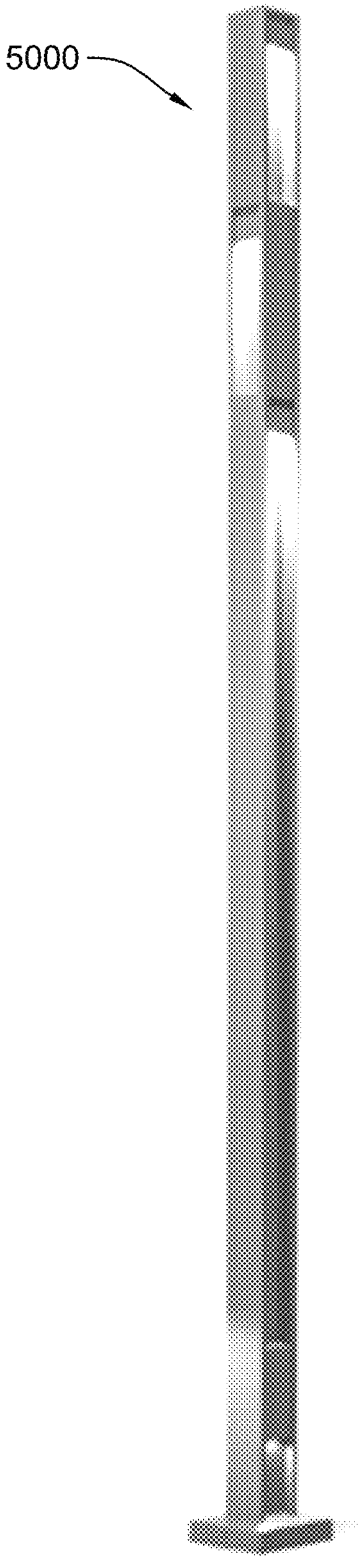
FIG. 45 is a front right perspective view of a modular lighting fixture having a plurality of sections illustrated with illumination, according to an embodiment of the present disclosure.
Figure 46:
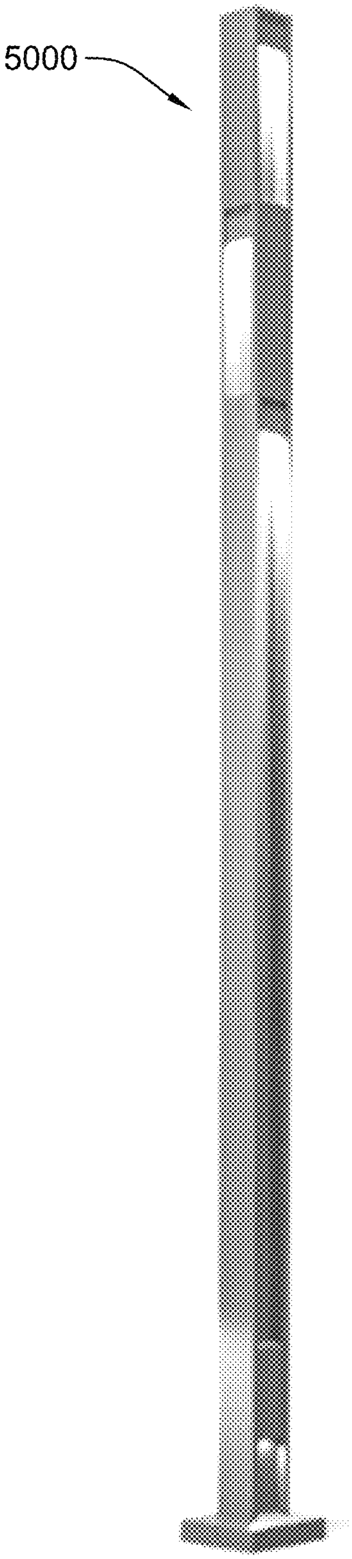
FIG. 46 is a rear left perspective view of the modular lighting fixture of FIG. according to an embodiment of the present disclosure.

FIGS. 45 and 46 illustrate a modular lighting fixture 5000 having a plurality of sections illustrated with illumination, according to an embodiment of the present disclosure.

The surfaces of the metal components of the sections and lights may be finished with polyester powder coat. The polyester powder coat may provide a hard yet flexible finish that may resist rusting, chipping, peeling and fading and requires no cleaning solvents once installed.

As may be recognized by those of ordinary skill in the art based on the teachings herein, numerous changes and modifications may be made to the above-described and other embodiments of the present disclosure without departing from the scope of the disclosure. The components of the modular lighting fixtures as disclosed in the specification, including the accompanying abstract and drawings, may be replaced by alternative component(s) or feature(s), such as those disclosed in another embodiments, which serve the same, equivalent or similar purpose as known by those skilled in the art to achieve the same, equivalent or similar results by such alternative component(s) or feature(s) to provide a similar function for the intended purpose. In addition, the modular lighting fixtures may include more or fewer components or features than the embodiments as described and illustrated herein. Accordingly, this detailed description of the currently-preferred embodiments is to be taken in an illustrative, as opposed to limiting of the disclosure. For example, in some embodiments of the lighting fixture, some of the sections need not include a light source.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has", and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The disclosure has been described with reference to the preferred embodiments. It will be understood that the embodiments described herein are exemplary of a plurality of possible arrangements to provide the same general features, characteristics, and general system operation. Modifications and alterations will occur to others upon a reading and understanding of the preceding detailed description. It is intended that the disclosure be construed as including all such modifications and alterations.

The invention claimed is:

1. A lighting fixture comprising:

a main elongated member having an upper portion, a lower portion, an H-shaped cross-section, and a main longitudinal axis, the main elongated member comprising a first flange, a second flange, and a web defining a first channel along a first side of the web and the flanges and a second channel along a second side of the web and the flanges;

a first elongated member having an upper portion, a lower portion, an H-shaped cross-section, and a first longitudinal axis, the first elongated member comprising a first flange, a second flange, and a web defining a first channel along a first side of the web and the flanges and a second channel along a second side of the web and the flanges;

the lower portion of the first elongated member operably attached to the upper portion of the main elongated member;

the main longitudinal axis being coaxial with the first longitudinal axis, and the flanges of the first elongated member being disposed 90 degrees relative the flanges of the main elongated member;

at least one first light source attached to the lighting fixture disposed in the channel of the first elongated member or in a housing extending outwardly from the first elongated member between the first flange and the second flange of the first elongated member; and at least one second light source attached to the lighting fixture and disposed in one of the channels of the main elongated member.

2. The lighting fixture of claim 1 further comprising:

a second elongated member having an upper portion, a lower portion, an H-shaped cross-section, and a second longitudinal axis, the second elongated member comprising a first flange, a second flange, and a web defining a first channel along a first side of the web and the flanges and a second channel along a second side of the web and the flanges;

the lower portion of the second elongated member operably attached to the upper portion of the first elongated member;

and the second longitudinal axis being coaxial with the first longitudinal axis, and the flanges of the second elongated member being disposed 90 degrees relative the flanges of the first elongated member.

3. The lighting fixture of claim 2 further comprising at least one light source attached to the second elongated member.

4. The lighting fixture of claim 3 wherein:

the at least one light source is disposed adjacent to the upper portion of the second elongated member and entirely within the first channel of the second elongated member and light from the at least one second light source is directed downwardly along the first channel of the second elongated member; or the at least one light source is disposed in a housing positioned adjacent to the upper portion of the second elongated member and extending outwardly from the second elongated member between the first flange and the second flange of the second elongated member.

5. The lighting fixture of claim 2 wherein:

the at least one light source is disposed in a housing positioned adjacent to the upper portion of the second elongated member, and the housing extending outwardly from the second elongated member between the first flange and the second flange of the second elongated member.

6. The lighting fixture of claim 2 further comprising:

a cap attached to the upper portion of the second elongated member;

a spacer plate attached between the first upper portion of the main elongated member and the lower portion of the first elongated member;

a spacer plate attached between the second upper portion of the first elongated member and the lower portion of the second elongated member; and a base plate attached to the lower portion of the main elongated member, the base plate have an H-shaped aperture for receiving the lower portion of the H-shaped elongated member.

7. The lighting fixture of claim 2 wherein:

the main elongated member comprises a H-shaped cross-section having a hollow web;

the first elongated member comprises a H-shaped cross-section having a hollow web; and the second elongated member comprises a H-shaped cross-section having a hollow web.

8. The lighting fixture of claim 1 wherein:

the at least one second light source is positioned adjacent to the upper portion of the main elongated member and disposed entirely within the first channel; and light from the at least one second light source is directed downwardly along the first channel of the main elongated member.

9. The lighting fixture of claim 8 further comprising a shield aligned with ends of the flanges for obscuring the at least one second light source from view by an observer.

10. The lighting fixture of claim 1 wherein:

the at least one first light source is disposed in the housing positioned adjacent to the upper portion of the first elongated member, and the housing extending outwardly from the first elongated member between the first flange and the second flange of the first elongated member.

11. The lighting fixture of claim 1 wherein:

the at least one second light source comprises at least two light sources, one disposed entirely within the first channel and the other disposed entirely within the second channel of the main elongated member; or the at least one first light source comprises at least two light sources, one disposed in a first housing positioned adjacent to the upper portion of the first elongated member, the first housing extending outwardly from the first elongated member between the first flange and the second flange on one side of the first elongated member, and the other disposed in a second housing positioned adjacent to the upper portion of the first elongated member, the second housing extending outwardly from the first elongated member between the first flange and the second flange on the other side of the first elongated member.

12. The lighting fixture of claim 1 wherein the first and/or main elongated member comprises the H-shaped cross-section having a hollow web.

13. The lighting fixture of claim 1 further comprising:

a base plate attached to the lower portion of the main elongated member, the base plate have an H-shaped aperture for receiving the lower portion of the H-shaped main elongated member.

14. The lighting fixture of claim 1 further comprising:

at least one footer light source attached to the lower portion of the main elongated member; and wherein:

light from the at least one footer light source is directed downwardly along the first channel of the main elongated member.

15. The lighting fixture of claim 1 wherein:

the main elongated member comprises a longitudinal length greater than a first longitudinal length of the first elongated member.

16. The lighting fixture of claim 1 wherein the at least one first light source comprises a light source disposed in the first channel of the first elongated member and the at least one second light source comprises a light source disposed in the first channel of the main elongated member.

17. The lighting fixture of claim 1 wherein:

the at least one first light source is disposed adjacent to the upper portion of the first elongated member and entirely within the first channel of the first elongated member and light from the at least one first light source is directed downwardly along the first channel of the first elongated member; or the at least one first light source is disposed in a housing positioned adjacent to the upper portion of the first elongated member and extending outwardly from the first elongated member between the first flange and the second flange of the first elongated member.

18. The lighting fixture of claim 1 wherein the lighting fixture comprises the main elongated member having a longitudinal length greater than 9 feet.

19. The lighting fixture of claim 1 wherein the lighting fixture comprises the first elongated member having a longitudinal length of 2 feet.

20. The lighting fixture of claim 1 wherein wherein the lighting fixture comprises the main elongated member having a longitudinal length greater than 9 feet, and the first elongated member having a longitudinal length of 2 feet.

21. A method for use in forming a modular lighting fixture, the method comprising:

receiving a selection for a first elongated member from a plurality of different elongated members having an upper portion, a lower portion, an H-shaped cross-section, and a longitudinal axis, the first elongated member comprising a first flange, a second flange, and a web defining a first channel along a first side of the web and the flanges and a second channel along a second side of the web and the flanges;

receiving a selection for a main elongated member from a plurality of different main elongated members having an upper portion, a lower portion, an H-shaped cross-section, and a main longitudinal axis, the main section comprising a first flange, a second flange, and a web defining a first main channel along a first side of the web and the flanges and a second main channel along a second side of the web and the flanges;

receiving a selection of at least one first light source from a plurality of different light sources;

receiving a selection of at least one second light source from a plurality of different light sources;

obtaining a first elongated member based on the received selected elongated member;

obtaining a main elongated member based on the received selected main elongated member;

obtaining at least one light source based on the received selected at least one first light source;

attaching the obtained main elongated member to the first elongated member so that the main longitudinal axis is coaxial with the longitudinal axis, and the flanges of the first elongated member are disposed 90 degrees relative the flanges of the main elongated member;

attaching the obtained at least one first light source to the modular lighting fixture disposed in the channel of the first elongated member or in a housing extending outwardly from the first elongated member between the first flange and the second flange of the first elongated member; and attaching the obtained at least one second light source to the modular lighting fixture disposed in the channel of the main elongated member.

22. The method of claim 21, wherein the attaching comprises:

attaching the obtained at least one first light source adjacent to the upper portion of the first elongated member and entirely within the first channel of the first elongated member so that light from the at least one light source is directed downwardly along the first channel of the elongated member; or attaching the obtained at least one first light source in a housing positioned adjacent to the upper portion of the first elongated member and extending outwardly from the first elongated member between the first flange and the second flange of the section.

23. The method of claim 21 wherein the assembled lighting fixture comprises:

the first elongated member having a longitudinal length between 2 feet and 4 feet; or the main elongated member with a longitudinal length greater than 9 feet.

24. The method of claim 21 wherein:

the attaching the obtained at least one second light source adjacent to the upper portion of the main elongated member and entirely within the first channel of the first elongated member so that light from the at least one light source is directed downwardly along the first channel of the main elongated member.

25. The method of claim 21 further comprising:

receiving a selection for a second elongated member from a plurality of different elongated members having an upper portion, a lower portion, an H-shaped cross-section, and a longitudinal axis, the second elongated member comprising a first flange, a second flange, and a web defining a first channel along a first side of the web and the flanges and a second channel along a second side of the web and the flanges;

obtaining a second elongated member based on the received selected second elongated member;

attaching the obtained second elongated member to the first elongated member so that the second longitudinal axis is coaxial with the first longitudinal axis, and the flanges of the second elongated member are disposed 90 degrees relative the flanges of the first elongated member.

* * * * *